United States Patent
Tsukamoto

(10) Patent No.: US 9,840,155 B2
(45) Date of Patent: Dec. 12, 2017

(54) WIRELESS POWER SUPPLY WITH VEHICLE PAIRING SYSTEM AND POWER TRANSMISSION DEVICE

(71) Applicant: Nissan Motor Co., Ltd., Yokohama-Shi, Kanagawa (JP)

(72) Inventor: Yukinori Tsukamoto, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/114,720

(22) PCT Filed: Jan. 31, 2014

(86) PCT No.: PCT/JP2014/052260
§ 371 (c)(1),
(2) Date: Jul. 27, 2016

(87) PCT Pub. No.: WO2015/114796
PCT Pub. Date: Aug. 6, 2015

(65) Prior Publication Data
US 2016/0339790 A1    Nov. 24, 2016

(51) Int. Cl.
*H01M 10/46* (2006.01)
*B60L 11/18* (2006.01)
(Continued)

(52) U.S. Cl.
CPC ........... *B60L 11/1829* (2013.01); *B60L 11/18* (2013.01); *B60L 11/182* (2013.01);
(Continued)

(58) Field of Classification Search
CPC .. H02J 2007/0001; H02J 7/355; H02J 7/0042; H02J 7/1446; H02J 7/025; H02J 5/005
(Continued)

(56) References Cited

U.S. PATENT DOCUMENTS 8,004,235 B2    8/2011   Baarman et al.
8,593,105 B2    11/2013  Baarman et al.
(Continued)

FOREIGN PATENT DOCUMENTS

JP    2005151729 A    6/2005
JP    2012029528 A    2/2012
(Continued)

*Primary Examiner* — Edward Tso
(74) *Attorney, Agent, or Firm* — Young Basile Hanlon & MacFarlane, P.C.

(57) ABSTRACT

When a vehicle approaches a parking space, a ground controller sets a power transmission coil to first excitation in which the power transmission coil is excited in an excitation pattern containing identification data. When the power transmission coil is set to the first excitation, a vehicle controller acquires the identification data from the excitation pattern received by a power reception coil, and transmits the identification data to a power transmission device. Then, the ground controller determines whether or not the identification data contained in the excitation pattern when setting the power transmission coil to the first excitation and the identification data acquired from the excitation pattern received by the power reception coil match each other. If both pieces of identification data match each other, the ground controller sets the power transmission coil to second excitation.

7 Claims, 27 Drawing Sheets

(51) Int. Cl.
  *H02J 7/00* (2006.01)
  *H02J 17/00* (2006.01)
  *H02J 50/10* (2016.01)
  *H02J 7/02* (2016.01)
  *H02J 50/12* (2016.01)

(52) U.S. Cl.
  CPC ............ *B60L 11/1846* (2013.01); *H02J 7/00* (2013.01); *H02J 7/0027* (2013.01); *H02J 7/025* (2013.01); *H02J 17/00* (2013.01); *H02J 50/10* (2016.02); *H02J 50/12* (2016.02); *Y02T 10/7055* (2013.01)

(58) Field of Classification Search
  USPC .................... 320/104, 107, 108, 109, 114
  See application file for complete search history.

(56) References Cited

U.S. PATENT DOCUMENTS

| | | | |
|---|---|---|---|
| 8,872,472 B2 | 10/2014 | Baarman et al. | |
| 8,896,321 B2 | 11/2014 | Taguchi et al. | |
| 9,132,739 B2 | 9/2015 | Niizuma | |
| 9,197,093 B2 | 11/2015 | Sagata | |
| 2008/0079392 A1 | 4/2008 | Baarman et al. | |
| 2011/0267002 A1 | 11/2011 | Baarman et al. | |
| 2012/0153894 A1* | 6/2012 | Widmer | H04B 5/0037 320/108 |
| 2013/0038272 A1 | 2/2013 | Sagata | |
| 2013/0181669 A1 | 7/2013 | Kawasaki | |
| 2014/0021911 A1 | 1/2014 | Baarman et al. | |
| 2014/0257614 A1 | 9/2014 | Niizuma | |
| 2017/0113557 A1* | 4/2017 | Tsukamoto | B60L 11/182 |
| 2017/0126060 A1* | 5/2017 | Tsukamoto | H02J 50/10 |

FOREIGN PATENT DOCUMENTS

| | | |
|---|---|---|
| JP | 2013172506 A | 9/2012 |
| JP | 5348325 B2 | 11/2013 |
| JP | 2013247796 A | 12/2013 |
| WO | 2008038203 A2 | 4/2008 |
| WO | 2012042902 A1 | 4/2012 |
| WO | 2012086048 A1 | 6/2012 |
| WO | 2012111127 A1 | 8/2012 |
| WO | 2013077340 A1 | 5/2013 |

* cited by examiner

WIRELESS POWER SUPPLY WITH VEHICLE PAIRING SYSTEM AND POWER TRANSMISSION DEVICE

TECHNICAL FIELD

The present invention relates to a wireless power supply system and a power transmission device for wirelessly supplying power to a vehicle equipped with a battery such as an electric vehicle.

BACKGROUND

Heretofore, a wireless charge system disclosed in International Publication No. WO2012/042902 has been known which is configured to charge a battery provided to a vehicle by wirelessly supplying power to the vehicle. International Publication No. WO2012/042902 discloses that, in a case where a plurality of power transmission devices are present, a power transmission coil is weakly excited to generate a random signal, which is detected by a vehicle, and the vehicle and the power transmission device are paired with each other if it is confirmed that the random signals match each other between the vehicle and the power transmission device.

However, in the configuration in the conventional example disclosed in above International Publication No. WO2012/042902, in order to perform the pairing, the vehicle enters and stops in the parking space, and in this state a signal containing a random ID pattern is transmitted by the power transmission coil and received by the vehicle. For this reason, a problem arises in that it takes a long time before the vehicle starts to be actually charged after stopping in the parking space.

SUMMARY

The present invention has been made to solve this problem in the conventional art, and an object thereof is to provide a wireless power supply system and a power transmission device capable of quick pairing with a vehicle entering a parking space.

In a wireless power supply system according to one aspect of the present invention, a power transmission device includes an approach detection sensor configured to detect when a vehicle approaches a parking space, a power-supply control unit configured to control power to be supplied to a power transmission coil, and a power-transmission-side communication unit configured to communicate with a power reception device. Moreover, the power reception device includes a power-reception control unit configured to control reception of power at a power reception coil, and a power-reception-side communication unit configured to communicate with the power transmission device. When the vehicle approaches the parking space, the power-supply control unit sets the power transmission coil to first excitation in which the power transmission coil is excited in an excitation pattern containing identification data, and when the power transmission coil is set to the first excitation, the power-reception control unit acquires the identification data from the excitation pattern received by the power reception coil, and transmits the identification data to the power transmission device. Further, the power-supply control unit determines whether or not the identification data contained in the excitation pattern when setting the power transmission coil to the first excitation and the identification data acquired from the excitation pattern received by the power reception coil match each other, and if the pieces of identification data match each other, the power-supply control unit sets the power transmission coil to second excitation for determining whether or not the vehicle is present at a chargeable position in the parking space.

A power transmission device according to one aspect of the present invention includes: an approach detection sensor configured to detect when a vehicle approaches a parking space; a power-supply control unit configured to control current to be supplied to a power transmission coil; and a communication unit configured to communicate with the vehicle. When the vehicle approaches the parking space, the power-supply control unit sets the power transmission coil to first excitation in which the power transmission coil is excited in an excitation pattern containing identification data. When the communication unit receives identification data transmitted from the vehicle, the power-supply control unit determines whether or not the received identification data and the identification data contained in the excitation pattern when setting the power transmission coil to the first excitation match each other. If the pieces of identification data match each other, the power-supply control unit sets the power transmission coil to second excitation for determining whether or not the vehicle is present at a chargeable position in the parking space.

DETAILED DESCRIPTION OF THE EMBODIMENTS

Embodiments of the present invention will be described below with reference to the drawings.

Description of First Embodiment

Figure 1:
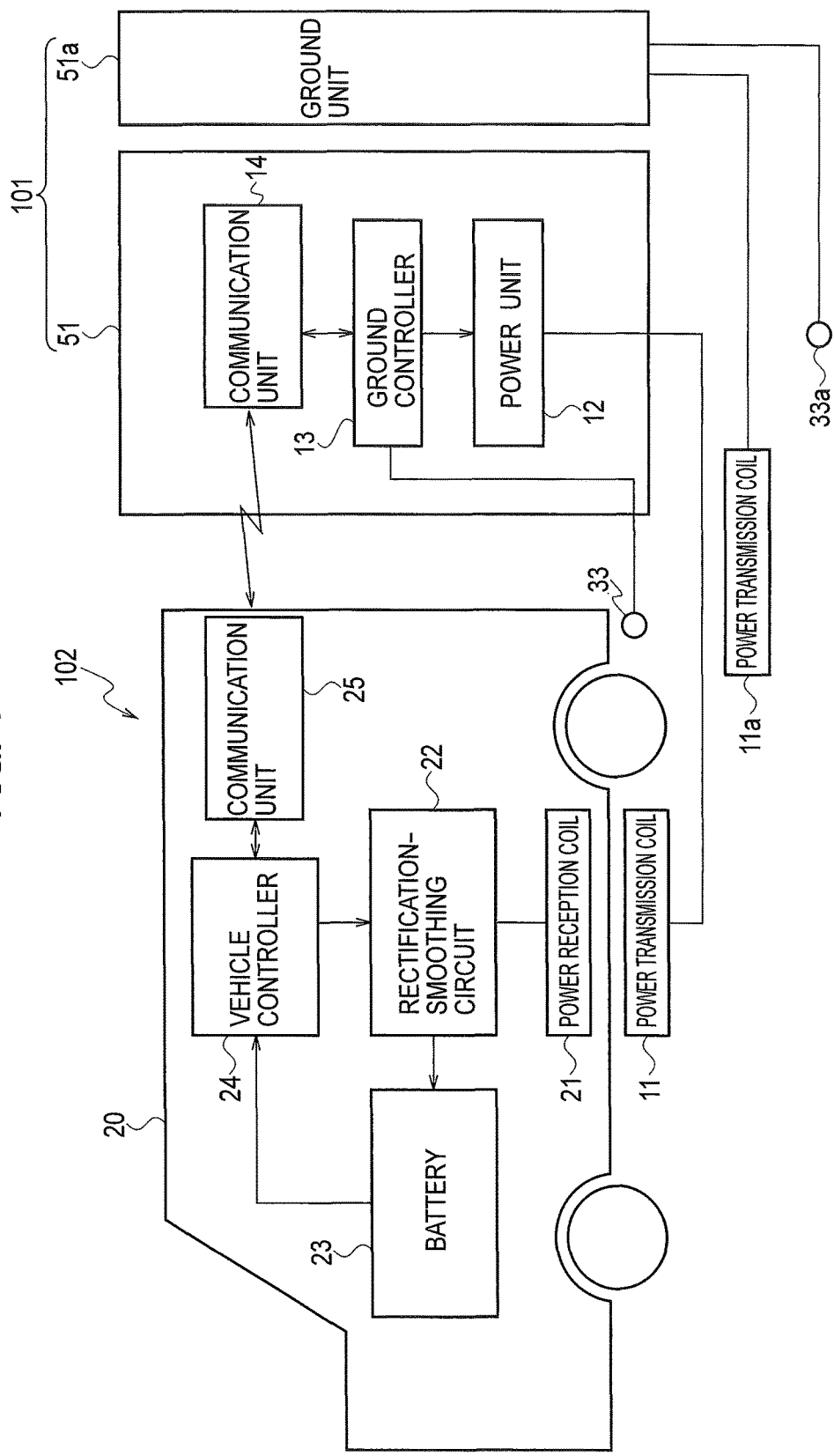
FIG. 1 is a block diagram showing the configuration of a wireless power supply system according to an embodiment of the present invention.

FIG. 1 is a block diagram showing the configuration of a wireless power supply system according to an embodiment of the present invention. As shown in FIG. 1, this wireless power supply system includes a power transmission device 101 provided to parking equipment on the ground, and a power reception device 102 mounted on a vehicle 20.

The power transmission device 101 includes a plurality of parking spaces each for charging a battery mounted on the vehicle 20, and includes a ground unit 51 for each parking space. Note that FIG. 1 shows two ground units 51, 51a as an example. The present invention is not limited to this configuration and is applicable to cases where the power transmission device 101 includes three or more ground units.

The ground unit 51 includes: a power transmission coil 11 installed on the ground of the parking space; a power unit 12 configured to excite the power transmission coil 11 by causing current to flow therethrough; a ground controller 13 (power-supply control unit) configured to control the actuation of the power unit 12; and a communication unit 14 (power-transmission-side communication unit) configured to perform wireless communication with the power reception device 102. To the ground controller 13, a vehicle detection sensor 33 (approach detection sensor) is connected which is configured to detect when the vehicle 20 approaches the parking space. Meanwhile, the ground unit 51a also has a similar configuration, and a power transmission coil 11a and a vehicle detection sensor 33a are connected thereto. Note that the ground units 51, 51a can each be constructed of an integrated computer including a central processing unit (CPU) and storage means such as an RAM, an ROM, and a hard disk drive, for example.

The power reception device 102, which is mounted on the vehicle 20, includes a power reception coil 21 installed at an appropriate position on the bottom of the vehicle 20, and a rectification-smoothing circuit 22 configured to rectify and smooth AC current received by the power reception coil 21. The power reception device 102 further includes a vehicle controller (power-reception control unit) configured to control the actuation of the rectification-smoothing circuit 22, a battery 23 configured to be charged with power received by the power reception coil 21, and a communication unit 25 (power-reception-side communication unit) configured to communicate with the ground unit 51. The power reception coil 21 is disposed at such a position as to coincide with the above-mentioned power transmission coil 11 when the vehicle 20 is parked at a predetermined position in the parking space. Note that the power reception device 102 can be constructed of an integrated computer including a central processing unit (CPU) and storage units such as an RAM, an ROM, and a hard disk drive, for example.

Figure 2:
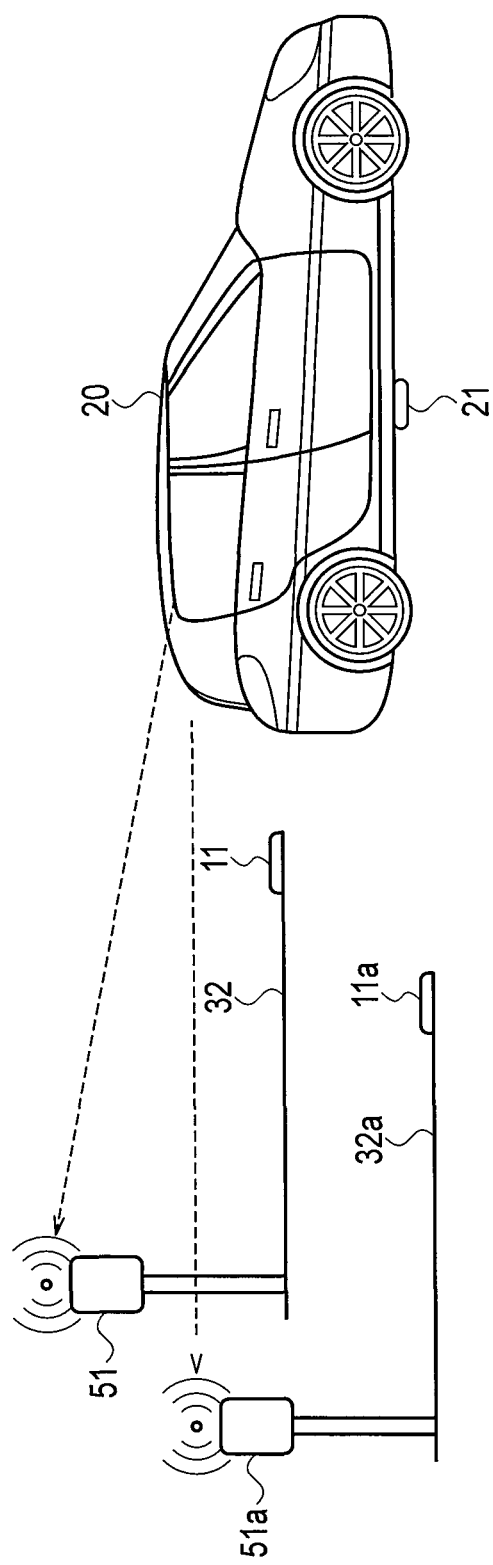
FIG. 2 is an explanatory diagram showing the relation between a vehicle and a plurality of parking spaces.

FIG. 2 is an explanatory diagram showing the relation between the vehicle 20 and a plurality of parking spaces 32, 32a. In this embodiment, a process of pairing the vehicle 20 and the parking space 32 at which the vehicle 20 is to be parked is performed through wireless communication between the ground units 51, 51a, provided at the parking spaces 32, 32a, and the power reception device 102, mounted on the vehicle 20. Then, the power transmission coil 11 at the parking space 32, paired with the vehicle 20, is energized and excited, thereby wirelessly supplying power to the power reception device 102. As a result, the battery 23, mounted on the vehicle 20, is charged.

Figure 3:
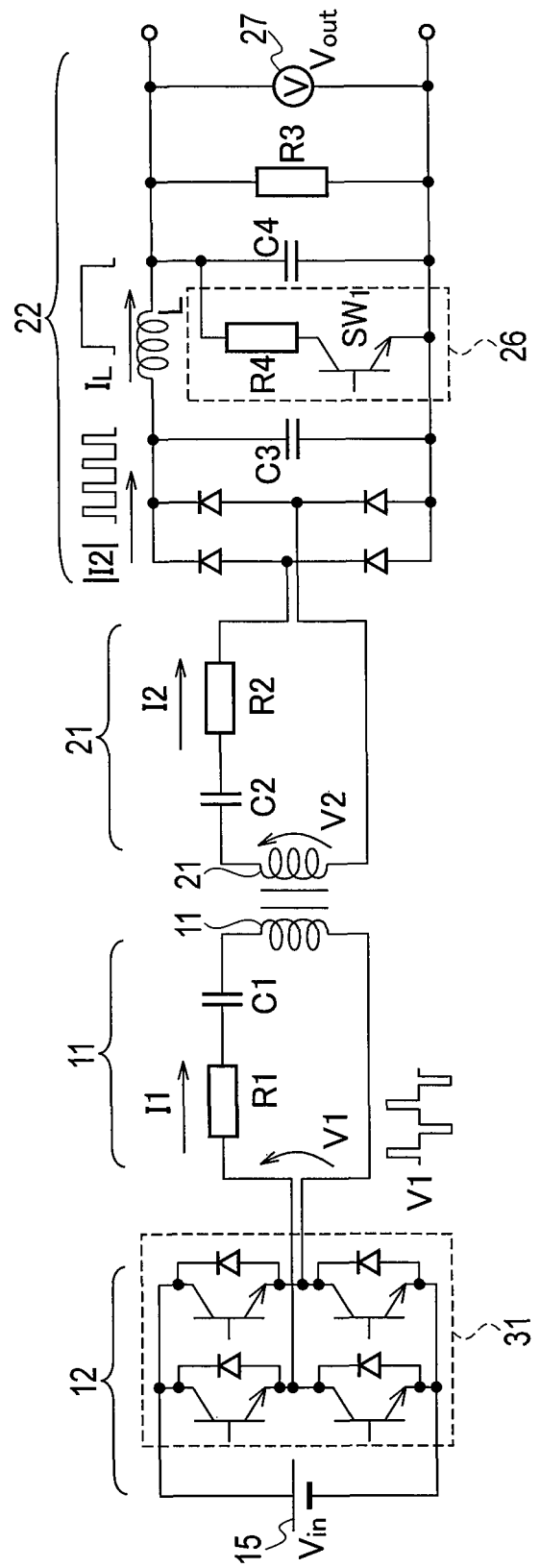
FIG. 3 is a circuit diagram of a power unit, a power transmission coil, a power reception coil, and a rectification-smoothing circuit of a wireless power supply system according to a first embodiment of the present invention.

FIG. 3 is a circuit diagram showing detailed configurations of the power unit 12, the power transmission coil 11, the power reception coil 21, and the rectification-smoothing circuit 22 shown in FIG. 1 and peripheral elements thereof. As shown in FIG. 3, the power unit 12 includes an inverter circuit 31 formed of a plurality of switch circuits (such for example as MOSFETs). The on and off of each switch circuit are controlled under control of the ground controller 13 (see FIG. 1) such that a DC voltage Vin supplied from a DC power source 15 is converted into an AC voltage of a predetermined frequency.

A resistor R1 and a capacitor C1 are connected to the power transmission coil 11. By applying the AC voltage outputted from the power unit 12 to the power transmission coil 11 and thereby causing a current to flow therethrough, the power transmission coil 11 can be set to one of first excitation and second excitation to be described later. Further, when the power transmission coil 11 and the power reception coil 21 are positioned to coincide with each other (when the coils 11, 21 are positioned to face each other as shown in FIG. 1), the power transmission coil 11 is set to third excitation in which a current for battery charge is supplied to the power transmission coil 11, to thereby wirelessly transmit power to the power reception coil 21.

A capacitor C2 and a resistor R2 are connected to the power reception coil 21, and the power reception coil 21 wirelessly receives the power transmitted from the power transmission coil 11. The rectification-smoothing circuit 22 includes a bridge circuit formed of a plurality of diodes, as well as capacitors C3, C4, a coil L, and a discharge resistor R3. The rectification-smoothing circuit 22 converts the AC voltage received by the power reception coil 21 into a DC voltage and further smoothes it and then supplies it to the battery 23 (see FIG. 1). The rectification-smoothing circuit 22 further includes a discharge circuit 26 formed of a resistor R4 and a switch SW1. A voltage sensor 27 configured to measure output voltage Vout is provided at the output terminal of the rectification-smoothing circuit 22. The output voltage Vout, measured by the voltage sensor 27, is outputted to the vehicle controller 24 (see FIG. 1). The on and off of the switch SW1 are controlled under control of the vehicle controller 24. Specifically, while the power transmission coil 11 is set to the first excitation, the switch SW1 is turned off if the output voltage Vout is at or below a preset threshold voltage Vth, and the switch SW1 is turned on to discharge the voltage stored in the capacitor C4 if the output voltage Vout exceeds the threshold voltage Vth.

Moreover, in this embodiment, when the vehicle 20 approaches the parking space 32, the power transmission coil 11 is set to the first excitation to perform pairing between the vehicle 20 and the ground unit 51. Further, after the pairing is completed, the power transmission coil 11 is set to the second excitation to determine whether or not the vehicle 20 is parked at the predetermined position in the parking space 32. The second excitation is an excitation pattern stronger than the first excitation. Then, if it is determined that the vehicle 20 is parked at the predetermined position in the parking space 32, the power transmission coil 11 is set to the third excitation to wirelessly supply power.

Figure 4:
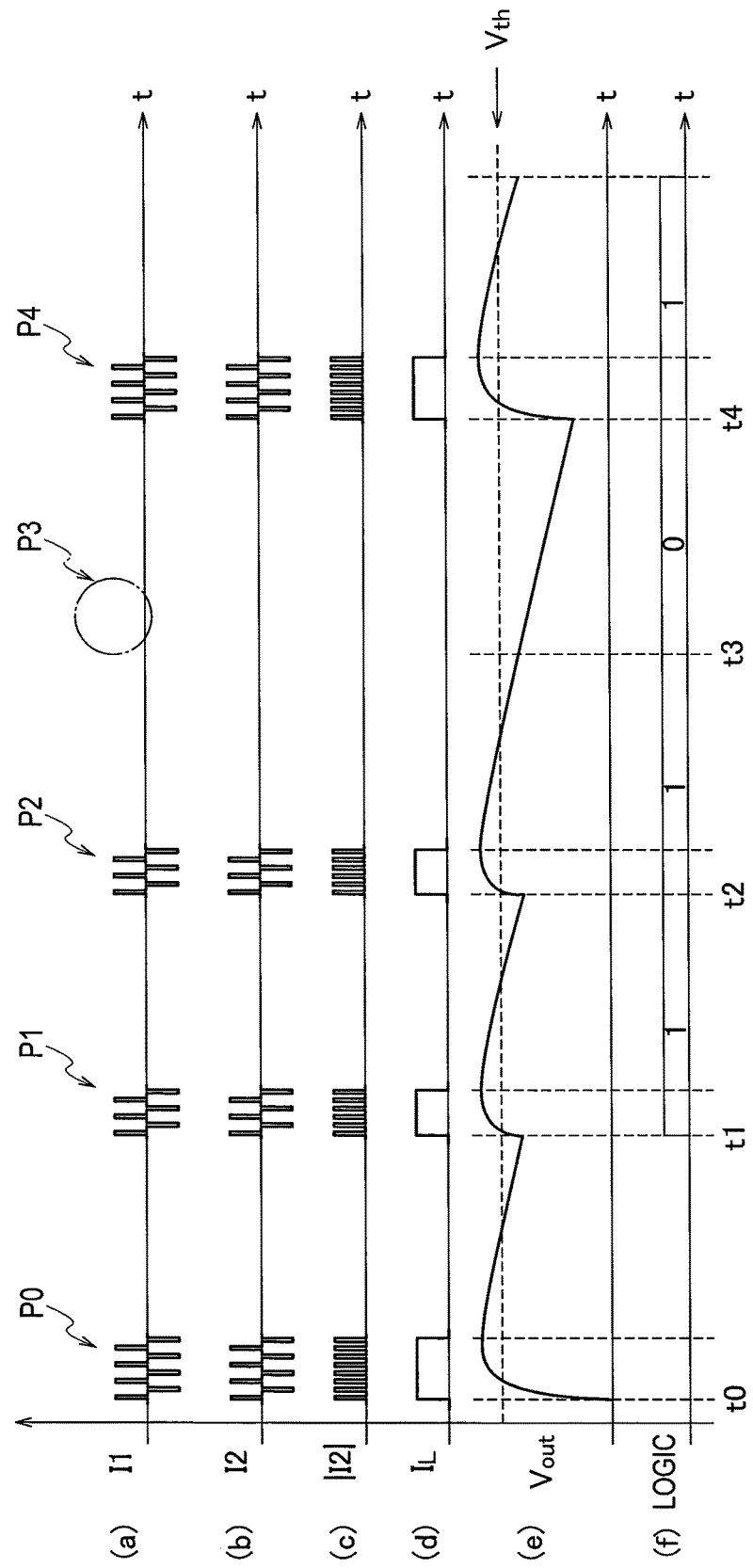
FIG. 4 is a timing chart showing the waveforms of signals in the wireless power supply system according to the first embodiment of the present invention, and Parts (a) to (f) show current I1, current I2, the absolute value of the current I2, current IL, output voltage Vout, and logics, respectively.

Next, the first excitation will be described with reference to a timing chart shown in FIG. 4. In FIG. 4, Part (a) shows the waveform of current I1 flowing through the power transmission coil 11, Part (b) shows the waveform of current I2 flowing through the power reception coil 21, and Part (c) shows the waveform of current obtained by performing full-wave rectification on the current I2. Further, Part (d) shows current IL obtained by smoothing the current I2 after the full-wave rectification, Part (e) shows the output voltage Vout from the rectification-smoothing circuit 22, and Part (f) shows a logic indicating "0" or "1" recognized from the output voltage Vout. In the first excitation, an identification ID (identification data) is set by means of a pattern of excitation of the power transmission coil 11.

In the first excitation, as shown in Part (a) of FIG. 4, a weak pulsed current P0 is caused to flow through the power transmission coil 11 as a start bit. When the vehicle 20 approaches the parking space 32, the current I2 flows through the power reception coil 21 as shown in Part (b) of FIG. 4. By rectifying this current I2, current |I2| shown in Part (c) of FIG. 4 is obtained. Then, by smoothing this current |I2|, the current IL shown in Part (d) of FIG. 4 is obtained.

As shown in Part (e) of FIG. 4, as the current IL flows through the rectification-smoothing circuit 22, the output voltage Vout rises at a time t0, the switch SW1 is turned on when the output voltage Vout exceeds the threshold voltage Vth, and the output voltage Vout then drops. After the start bit, pulsed currents P1, P2, P3, P4 are caused to flow at times t1, t2, t3, t4, respectively, to set a four-bit identification ID. Specifically, the current I1 is caused to flow as shown by P1, P2, P4 to set a logic "1" and the current I1 is not caused to flow as shown by P3 to set a logic "0." In the example shown in FIG. 4, an identification ID "1, 1, 0, 1" is generated.

Then, if the identification ID set by the ground unit 51 and the identification ID recognized by the vehicle controller 24 based on the output voltage Vout match each other, the vehicle 20 and the ground unit 51 are determined to have been paired with each other. In sum, the vehicle 20 and the parking space 32 can be paired with each other by setting the power transmission coil 11 to the first excitation. Also, though illustration is omitted in FIG. 4, a stop bit may be transmitted after the identification ID "1, 1, 0, 1." Meanwhile, there are a variety of methods for the first excitation, and details will be described in second to ninth embodiments.

Next, the second excitation will be described. After the power transmission coil 11 is set to the first excitation and pairing between the vehicle 20 and the ground unit 51 is completed as mentioned above, the power transmission coil 11 is set to the second excitation to determine whether or not the parked position of the vehicle 20 in the parking space 32 is a chargeable position.

The ground controller 13 sets the power transmission coil 11 to the second excitation, which is weaker than the excitation during battery charge (third excitation), by causing a current lower than the current during battery charge (third excitation) to flow through the power transmission coil 11. Specifically, in the second excitation, the current to be caused to flow through the power transmission coil 11 is set such that power having a preset power-supply command value can be supplied. The vehicle controller 24 detects the power received by the power reception coil 21 and further calculates power transmission efficiency Q1 based on the power-supply command value. It is then determined whether or not the vehicle 20 reaches the chargeable position, based on this power transmission efficiency Q1. In other words, it is determined whether or not the power reception coil 21 is present within a chargeable range within which it can be charged by the power transmission coil 11.

Specifically, as the vehicle 20 enters the parking space 32, the power transmission coil 11 and the power reception coil 21 approach each other, and when the power transmission coil 11 and the power reception coil 21 coincide with each other at least partly, the magnetic flux generated at the power transmission coil 11 links to the power reception coil 21, so that power is transmitted and charges the battery 23. Further, as the area of the overlapping regions increases, the magnetic flux linking to the power reception coil 21 increases and the power transmission efficiency rises accordingly. In contrast, as the overlapping regions of the power transmission coil 11 and the power reception coil 21 decrease, the leakage flux increases and the power transmission efficiency drops accordingly. Then, it is possible to determine whether or not the vehicle 20 is parked at the chargeable position in the parking space 32, that is, it is possible to determine whether or not the power reception coil 21 is present in the chargeable range, by setting a threshold efficiency Qth indicating the lower limit of the power transmission efficiency and detecting whether or not the power transmission efficiency Q1 exceeds the threshold efficiency Qth.

Meanwhile, when the area of the overlapping regions of the power transmission coil 11 and the power reception coil 21 is small, the time required for wireless charge is long but the charge is nonetheless possible. Thus, the power transmission efficiency at a point when at least part of the magnetic flux links can be set as the above-mentioned threshold efficiency Qth.

Note that the vehicle controller 24 does not necessarily have to calculate the power transmission efficiency Q1. The ground controller 13 may calculate the power transmission efficiency Q1. In this case, data on the power received by the power reception coil 21 may be transmitted to the ground controller 13 via the communication unit 25 and the communication unit 14, and the ground controller 13 may calculate the power transmission efficiency Q1.

Here, in the second excitation, the current caused to flow through the power transmission coil 11 is higher than the current caused to flow therethrough in the first excitation. This is to prevent the vehicle controller 24 from falsely recognizing that the power transmission coil 11 is set to the second excitation while the power transmission coil 11 is set to the first excitation.

Thereafter, if it is determined as a result of the above-described second excitation that the power reception coil 21 is present in the rechargeable range, the ground controller 13 sets the power transmission coil 11 to the third excitation to supply power for battery charge.

Next, the procedure of the processing by the ground controller 13 and the vehicle controller 24 will be described with reference to sequence charts shown in FIGS. 17 to 21. Firstly, in Step a1 in FIG. 17, the ground controller 13 is in a standby state. Then, as the vehicle 20 approaches the parking space 32 in Step b1, the vehicle controller 24 transmits in Step b2 an authentication ID provided to the vehicle 20 to the power transmission device 101 through radio communication. For this communication, a wireless LAN can be used, for example.

The ground controller 13 receives the authentication ID in Step a2 and authenticates the received authentication ID in Step a3. In one example, the ground controller 13 determines whether or not the received authentication ID is an authentication ID given to a vehicle 20 that is permitted to perform charge, and authenticates the authentication ID if the vehicle 20 has been permitted to perform charge.

In Step a4, the ground controller 13 activates the ground unit 51. Further, in Step a5, the ground controller 13 transmits a signal indicating that the ground unit 51 is activated, to the vehicle controller 24 through wireless communication. In Step a6, the ground controller 13 actuates the vehicle detection sensor 33. In Step a7, the ground controller 13 waits for the vehicle 20 to approach.

Figure 24:
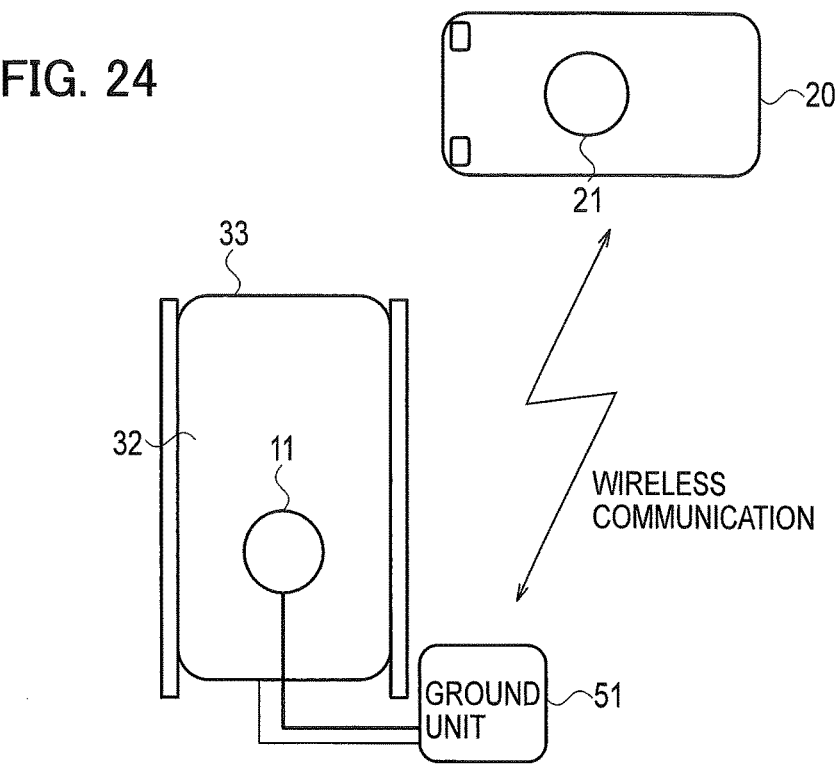
FIG. 24 is an explanatory diagram showing that the vehicle is approaching a parking space.

On the other hand, in Step b3, the vehicle controller 24 notifies the user (such as an occupant of the vehicle 20) that the ground unit 51 is activated. In Step b4, the vehicle controller 24 waits for a pairing signal from the ground controller 13. In doing so, the vehicle 20 continues approaching the parking space 32. That is, the vehicle 20 is approaching the parking space 32, as shown in FIG. 24.

Figure 25:
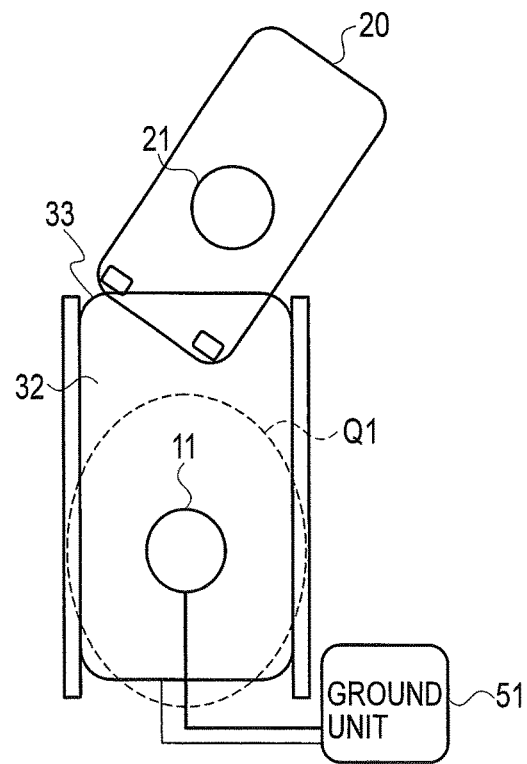
FIG. 25 is an explanatory diagram showing that part of the vehicle has entered the parking space.

When the vehicle 20 enters the parking space 32 in Step b5, the vehicle detection sensor 33 detects the entrance of the vehicle 20 in Step a8. Specifically, when the vehicle 20 reaches the inside of the detection range of the vehicle detection sensor 33 set in the parking space 32 as shown in FIG. 25, the vehicle detection sensor 33 detects that the vehicle 20 has entered the parking space 32. In Step b6, the vehicle controller 24 continues waiting for pairing.

In Step a9, the ground controller 13 starts the first excitation. Specifically, as shown in above-mentioned Part (a) of FIG. 4, the ground controller 13 causes pulsed currents to flow through the power transmission coil 11 at a predetermined frequency, so that the current P0, serving as a start bit signal, and the currents P1 to P4, indicating a four-bit identification ID, are caused to flow therethrough. The ground controller 13 repeatedly causes the currents P0, P1 to P4 to flow. The ground controller 13 waits for a pairing request in Step a10 and continues the first excitation in Step a11.

Figure 26:
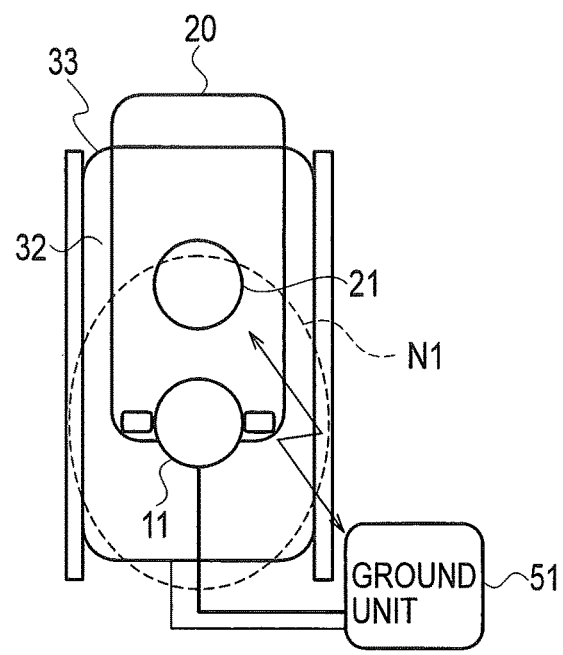
FIG. 26 is an explanatory diagram showing that the vehicle has entered the parking space and its power reception coil has reached the inside of the excitation range of the power transmission coil.

When the power reception coil 21, mounted on the vehicle 20, enters an excitation range N1 of the power transmission coil 11 shown in FIG. 26 in Step b7, the vehicle controller 24 receives the four-bit identification ID in Step b8. Specifically, the vehicle controller 24 recognizes the identification ID "1, 1, 0, 1" as shown in Part (f) of FIG. 4, based on the relation in magnitude between the output voltage Vout and the threshold voltage Vth shown in Part (e) of FIG. 4.

In Step b9, the vehicle controller 24 transmits the recognized identification ID toward the ground controller 13 to request pairing. In Step a12, the ground controller 13 receives the transmitted identification ID. In Step a13, the vehicle 20 and the ground unit 51 are paired with each other. Specifically, the vehicle 20 and the ground unit 51 are paired with each other if the four-bit identification ID transmitted by the ground unit 51 and the four-bit identification ID received by the power reception device 102 match each other.

Figure 27:
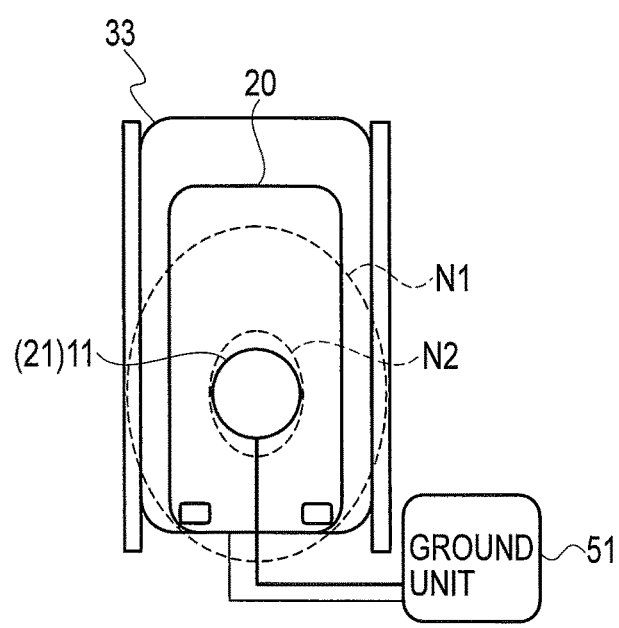
FIG. 27 is an explanatory diagram showing that the vehicle has entered the parking space and its power reception coil has reached a chargeable position.

Then in Step a14, the ground unit 51 changes the current caused to flow through the power transmission coil 11 to set the power transmission coil 11 to the second excitation. That is, the ground unit 51 starts the second excitation. In Step b10, the vehicle controller 24 starts determining whether or not the vehicle 20 reaches the chargeable position in the parking space 32. Specifically, as shown in FIG. 27, the vehicle controller 24 determines that the vehicle 20 reaches the chargeable position when the area of the overlap between the power reception coil 21 and the power transmission coil 11 increases and the power transmission efficiency Q1 accordingly rises and exceeds the preset threshold efficiency Qth. The vehicle controller 24 can determine that the vehicle 20 reaches the chargeable position if the power reception coil 21 is present in a powerable range N2, for example.

Figure 18:
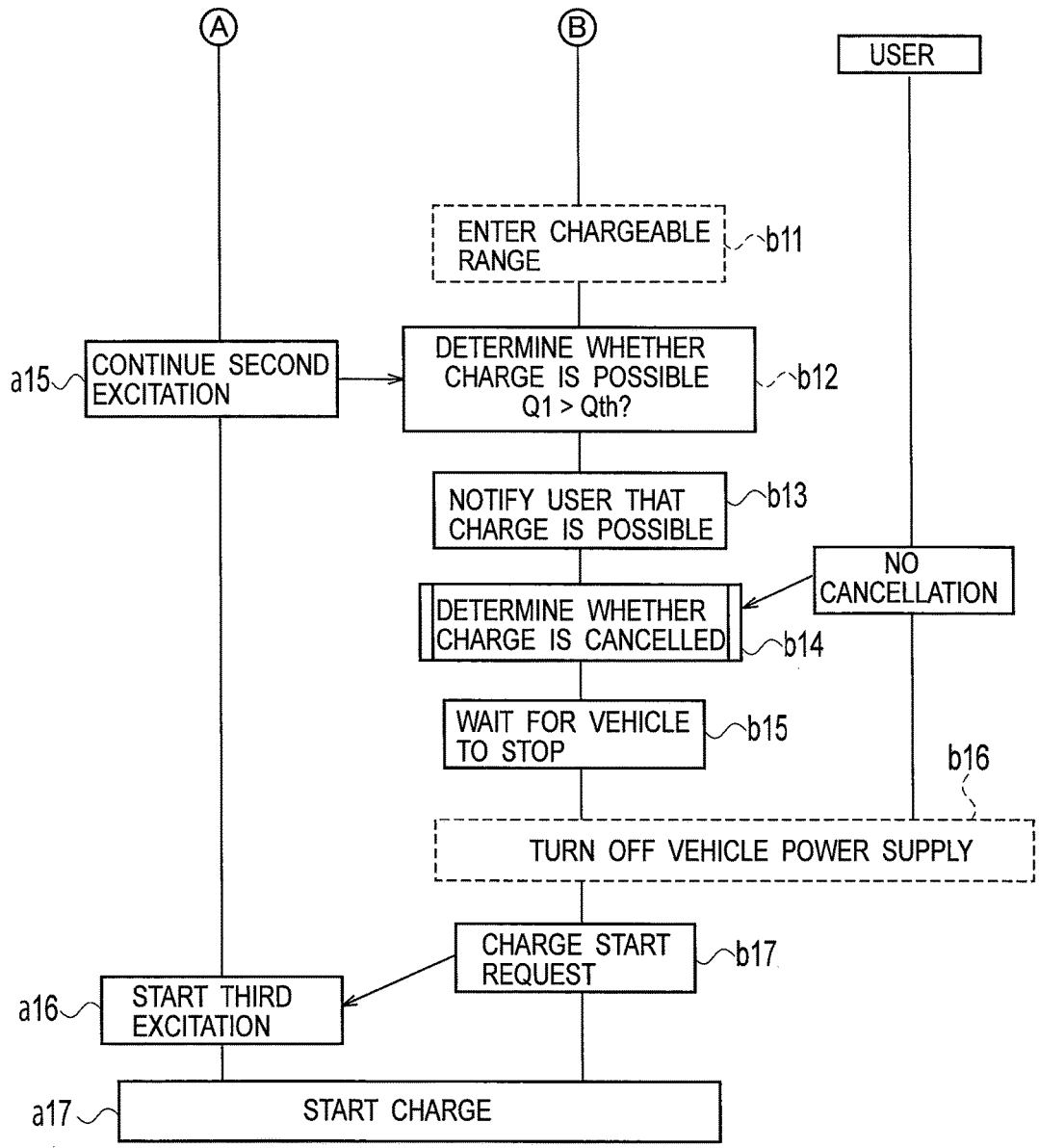
FIG. 18 is a sequence chart showing the procedure of the processing by the ground controller and the vehicle controller.

If the vehicle 20 enters the chargeable range in the parking space 32 in Step b11 in FIG. 18 and also the second excitation of the power transmission coil 11 is being continued in Step a15, the vehicle controller 24 determines in Step b12 whether or not the power transmission efficiency Q1 exceeds the threshold efficiency Qth. Whether or not the power transmission efficiency Q1 exceeds the threshold efficiency Qth can be determined based on the magnitude of the voltage generated at the power reception coil 21 by the excitation. If Q1>Qth, the vehicle controller 24 notifies the user in Step b13 that the battery 23 can now be charged, by means of a display (not shown) or the like.

In Step b14, the vehicle controller 24 performs a cancel determination process. This process determines whether or not to perform charge, based on whether or not the user inputs cancel operation. Details will be described later with reference to FIG. 19.

If there is no cancel operation, the vehicle controller 24 determines in Step b15 whether or not the vehicle 20 is stopped. If the vehicle 20 is stopped, the vehicle power source is turned off in Step b16. Then in Step b17, the vehicle controller 24 transmits a charge start request signal to the ground controller 13.

In Step a16, the ground controller 13 sets the power transmission coil 11 to the third excitation. In Step a17, the power supplied to the power transmission coil 11 is wirelessly supplied to the power reception coil 21 to charge the battery 23 (see FIG. 1). As described above, the battery 23 can be charged by setting the power transmission coil 11 to the first excitation to pair the ground unit 51 and the vehicle 20 with each other, setting the power transmission coil 11 to the second excitation to check whether the vehicle 20 is parked at the chargeable position in the parking space 32, and thereafter wirelessly supplying power.

Figure 19:
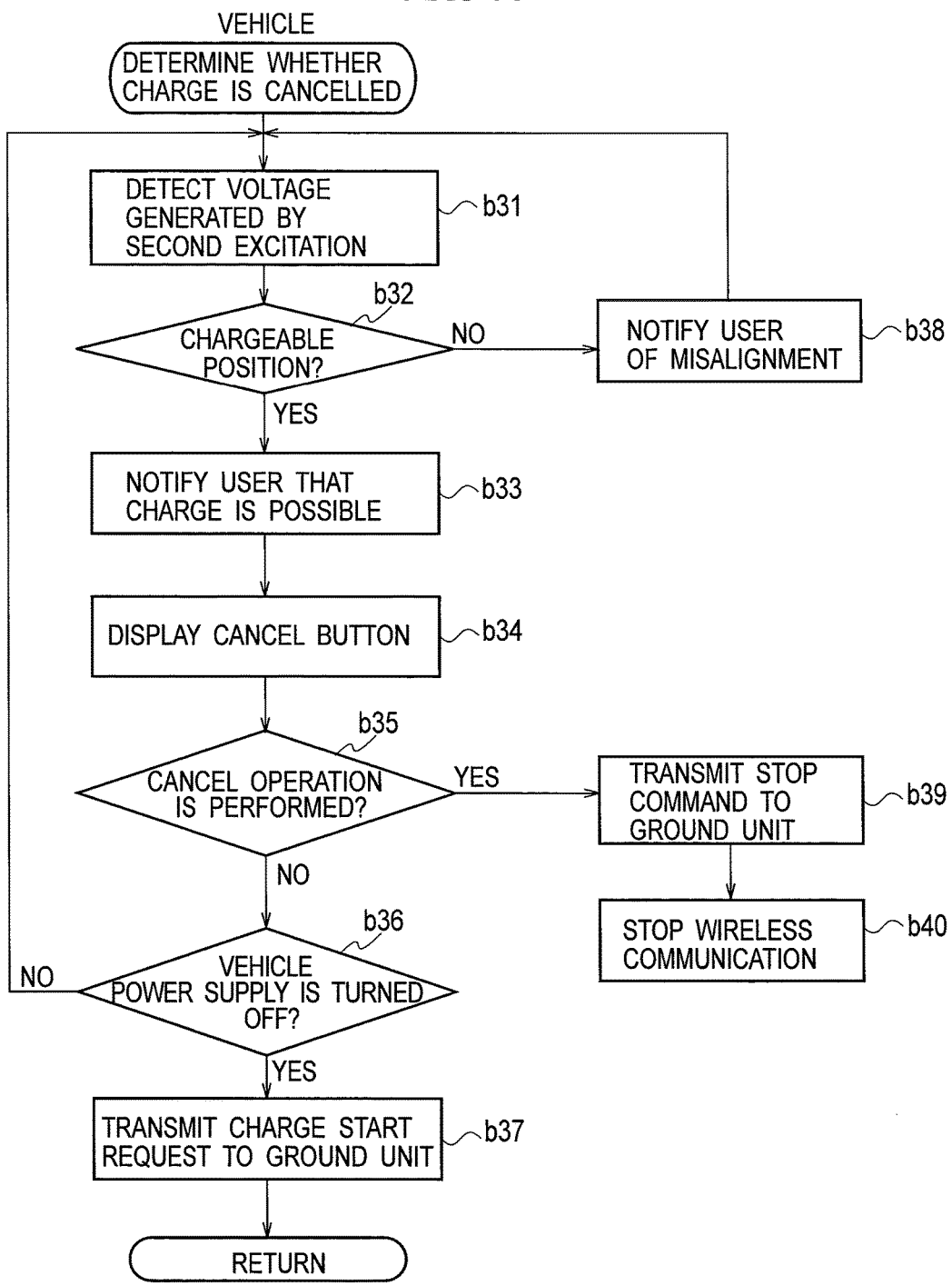
FIG. 19 is a flowchart showing the procedure of a cancel determination process by the vehicle controller.

Next, details of the cancel determination process, shown in Step b14 in FIG. 18, will be described with reference to a flowchart shown in FIG. 19. Firstly in Step b31, the vehicle controller 24 detects the voltage received by the power reception coil 21 while the power transmission coil 11 is set to the second excitation. In Step b32, the vehicle controller 24 determines whether or not the vehicle 20 is parked at the chargeable position in the parking space 32, based on the detected voltage.

If the vehicle 20 is not at the chargeable position, the vehicle controller 24 notifies the user in Step b38 that the vehicle 20 is misaligned relative to the predetermined position in the parking space 32, and the vehicle controller 24 moves the process back to Step b31. On the other hand, if the vehicle 20 is at the chargeable position, the vehicle controller 24 notifies the user in Step b33 that the vehicle 20 is parked at the chargeable position. Further, in Step b34, the vehicle controller 24 displays a cancel button on the display (not shown).

In Step b35, the vehicle controller 24 determines whether or not the user performs cancel operation. If the user performs cancel operation, the vehicle controller 24 transmits a command signal to stop the second excitation to the ground unit 51 in Step b39. In Step b40, the vehicle controller 24 stops the wireless communication with the ground controller 13.

On the other hand, if the user does not perform cancel operation, the vehicle controller 24 determines in Step b36 whether or not the vehicle power source is turned off. If the vehicle power source is turned off, the vehicle controller 24 determines that the vehicle 20 is ready for charge, and transmits a charge start request to the ground unit 51 in Step b37. The vehicle controller 24 then finishes this process. The user of the vehicle 20 can perform cancel operation in this manner.

Figure 17:
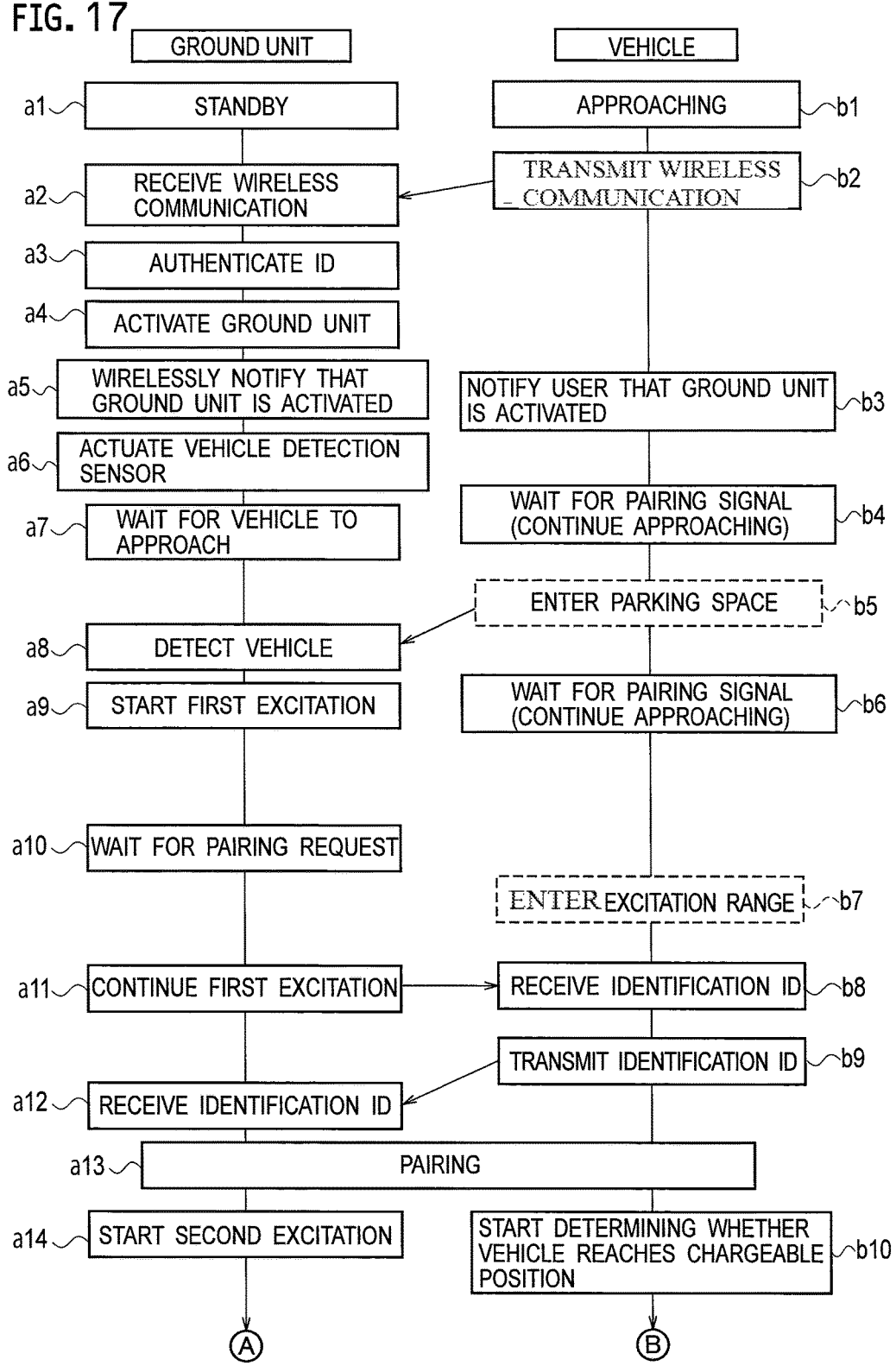
FIG. 17 is a sequence chart showing the procedure of processing by a ground controller and a vehicle controller.
Figure 20:
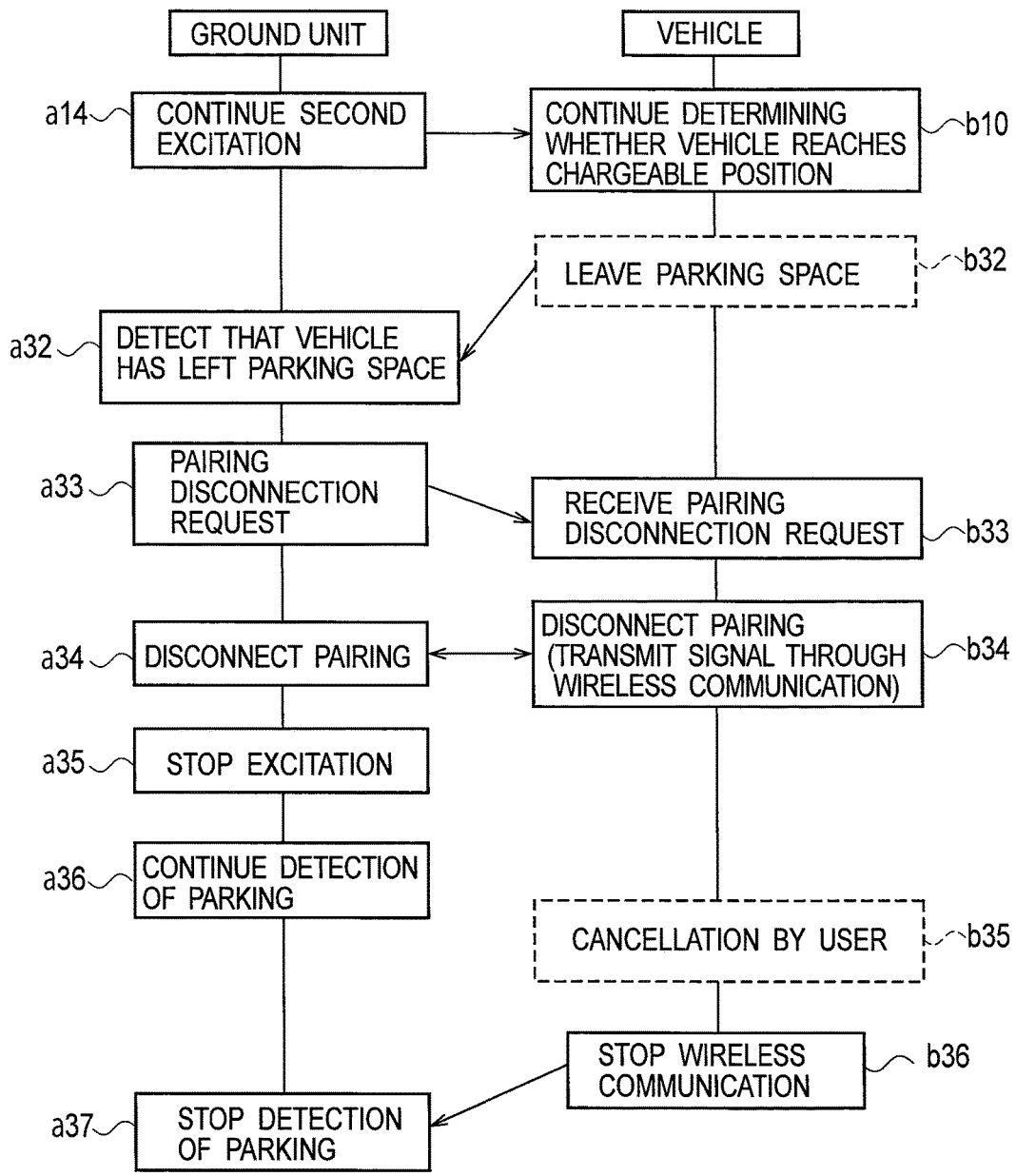
FIG. 20 is a sequence chart showing the procedure of processing performed by the ground controller and the vehicle controller when the vehicle leaves a parking space.

Next, processing performed in a case where the vehicle 20 leaves from the chargeable position will be described with reference to a sequence chart shown in FIG. 20. This processing is performed after Step a14 and Step b10, which are shown in FIG. 17. In Step b32, the vehicle 20 leaves the parking space 32 for a reason such as changing the parking space. Then in Step a32, the ground controller 13 detects that the vehicle 20 has left the parking space 32, based on the detection signal of the vehicle detection sensor 33.

In Step a33, the ground controller 13 transmits a request signal to disconnect the pairing with the vehicle 20. Specifically, since the ground unit 51 and the vehicle 20 have been paired with each other by the first excitation, this pairing needs to be disconnected if the battery 23 is not to be charged. The ground controller 13 therefore transmits a pairing-disconnection request signal.

In Step b33, the vehicle controller 24 receives the pairing-disconnection request signal. Further, in Step b34, the vehicle controller 24 transmits a signal indicating disconnection of the pairing to the ground unit 51. In response, the ground controller 13 disconnects the pairing with the vehicle 20. Then, upon cancellation by the user in Step b35, the vehicle controller 24 stops the wireless communication in Step b36.

On the other hand, in Step a34, the ground controller 13 disconnects the pairing with the vehicle 20. In Step a35, the ground controller 13 stops the second excitation of the power transmission coil 11. Then in Step a36, the ground controller 13 continues detecting whether or not the vehicle 20 is parked in the parking space 32. Thereafter, if the wireless communication with the vehicle controller 24 is stopped, the ground controller 13 stops the detection of the position of the vehicle with the vehicle detection sensor 33 in Step a37.

Figure 28:
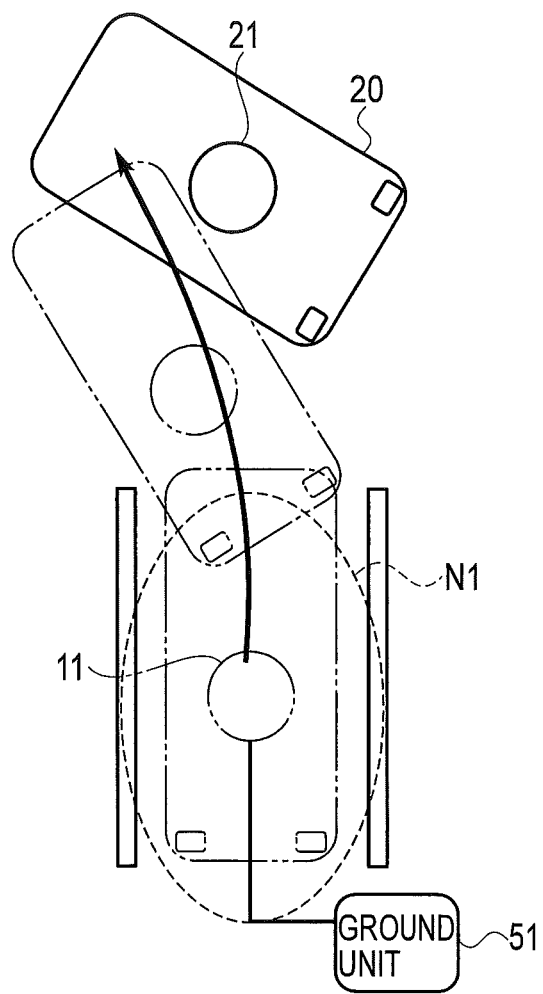
FIG. 28 is an explanatory diagram showing that the vehicle has entered the parking space but is then leaving the parking space.

FIG. 28 is an explanatory diagram showing movement of the vehicle 20 leaving from the chargeable position. As shown in FIG. 28, when the vehicle 20 leaves from the chargeable position, the vehicle 20 leaves the detection range of the vehicle detection sensor 33, and the pairing is therefore disconnected. When the user eventually performs charge cancel operation, the pairing is disconnected and the excitation of the power transmission coil 11 is stopped.

Figure 29:
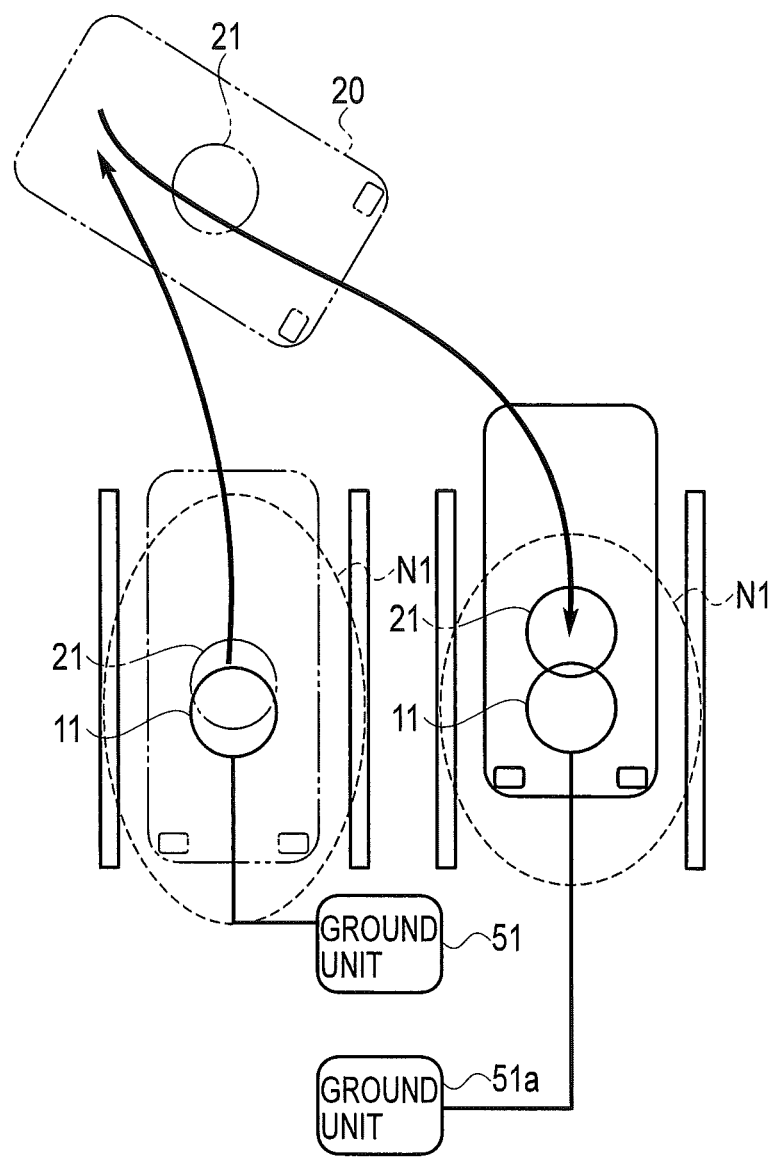
FIG. 29 is an explanatory diagram showing that the vehicle is changing its parking space.

Next, processing for changing the parking position of the vehicle 20 from the parking space 32 for the ground unit 51 to the parking space 32a for the ground unit 51a will be described with reference to a sequence chart shown in FIG. 21 and a movement diagram shown in FIG. 29. Note that, in the following, to distinguish the ground units 51, 51a, reference sign 51 denotes a first ground unit and reference sign 51a denotes a second ground unit. Likewise, to distinguish the parking spaces 32, 32a, reference sign 32 denotes a first parking space and reference sign 32a denotes a second parking space.

Figure 21:
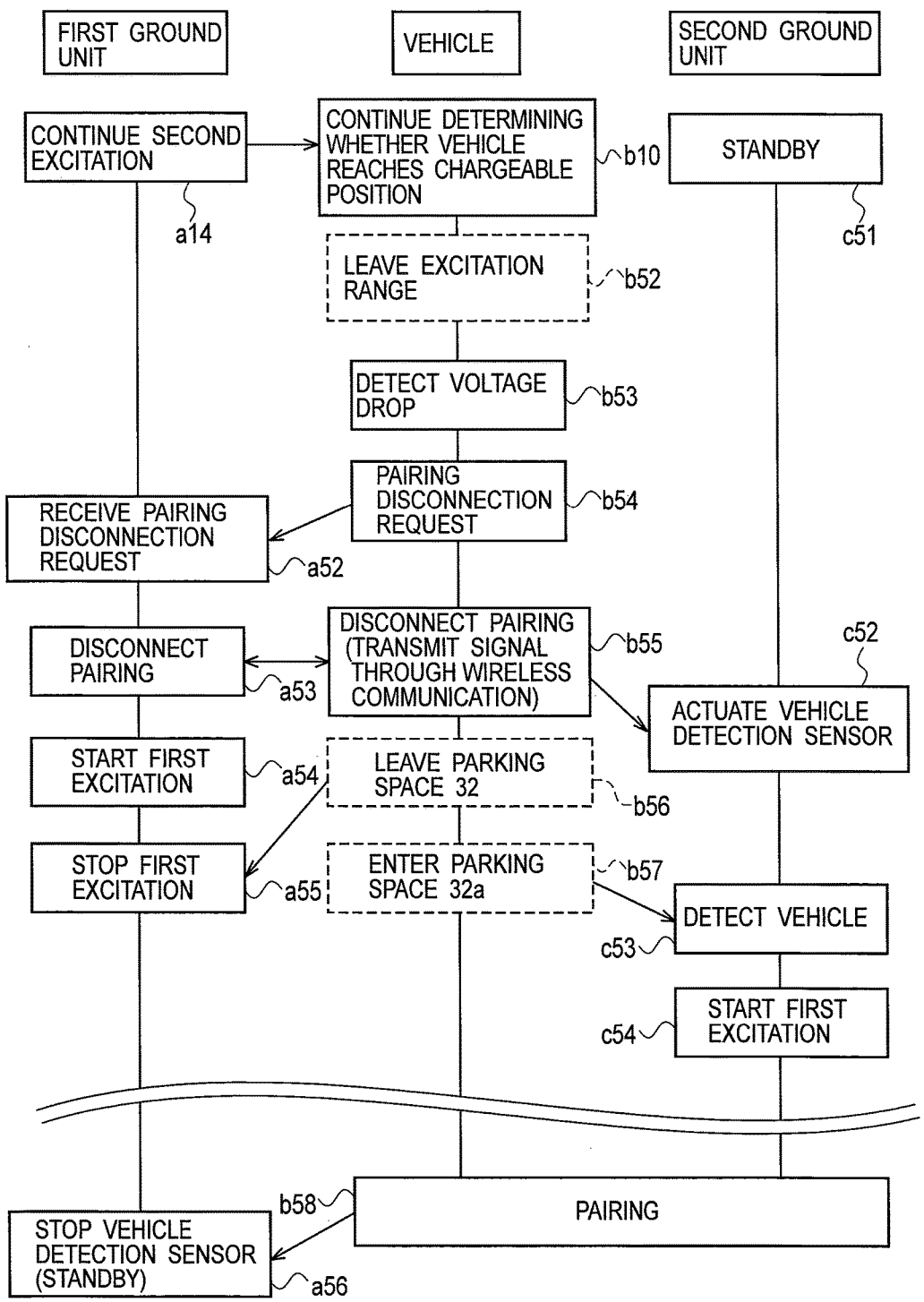
FIG. 21 is a sequence chart showing the procedure of processing performed by the ground controller and the vehicle controller when the vehicle changes its parking space.

The processing shown in FIG. 21 is performed after the Step a14 and Step b10, which are shown in FIG. 17. When the vehicle 20 leaves the excitation range (N1 shown in FIG. 29) of the power transmission coil 11 of the first ground unit 51 in Step b52, the vehicle controller 24 detects a drop in the voltage generated at the power reception coil 21 in Step b53. Specifically, as the area of the overlap between the power transmission coil 11 and the power reception coil 21 decreases, the voltage generated at the power reception coil 21 drops. Then, by detecting the voltage drop, the vehicle controller 24 can recognize that the vehicle 20 has left the excitation range N1.

The vehicle controller 24 transmits a pairing-disconnection request signal to the ground controller 13 in Step b54 and disconnects the pairing in Step b55. Specifically, since the vehicle 20 is not charging the battery 23 at the first parking space 32, the pairing between the first ground unit 51 and the vehicle 20 is disconnected. On the other hand, the ground controller 13 receives the pairing-disconnection request signal in Step a52 and disconnects the pairing in Step a53. Then in Step a54, the ground controller 13 starts the first excitation. That is, the ground controller 13 finishes the second excitation and starts the first excitation.

Meanwhile, in Step c51, the second ground unit 51a is a standby state. Upon receipt of wireless communication from the vehicle controller 24 in Step c52, the second ground unit 51a actuates the vehicle detection sensor 33a.

Then, when the vehicle 20 leaves the first parking space 32 in Step b56, the ground controller 13 of the first ground unit 51 stops the first excitation in Step a55. When the vehicle 20 enters the second parking space 32a in Step b57, the ground controller 13 of the second ground unit 51a detects in Step c53 that the vehicle 20 has entered the second parking space 32a. Further, the ground controller 13 of the second ground unit 51a starts the first excitation in Step c54.

Then, processing similar to the processing described earlier is performed, so that the second ground unit 51a and the vehicle 20 are paired with each other in Step b58. On the other hand, the vehicle detection sensor 33 of the first ground unit 51 is stopped in Step a56. As described above, in the case where the user of the vehicle 20 changes the parking position of the vehicle 20 from the first parking space 32 to the second parking space 32a, the above processing is performed and the battery 23 can thus be charged using the second ground unit 51a.

Figure 22:
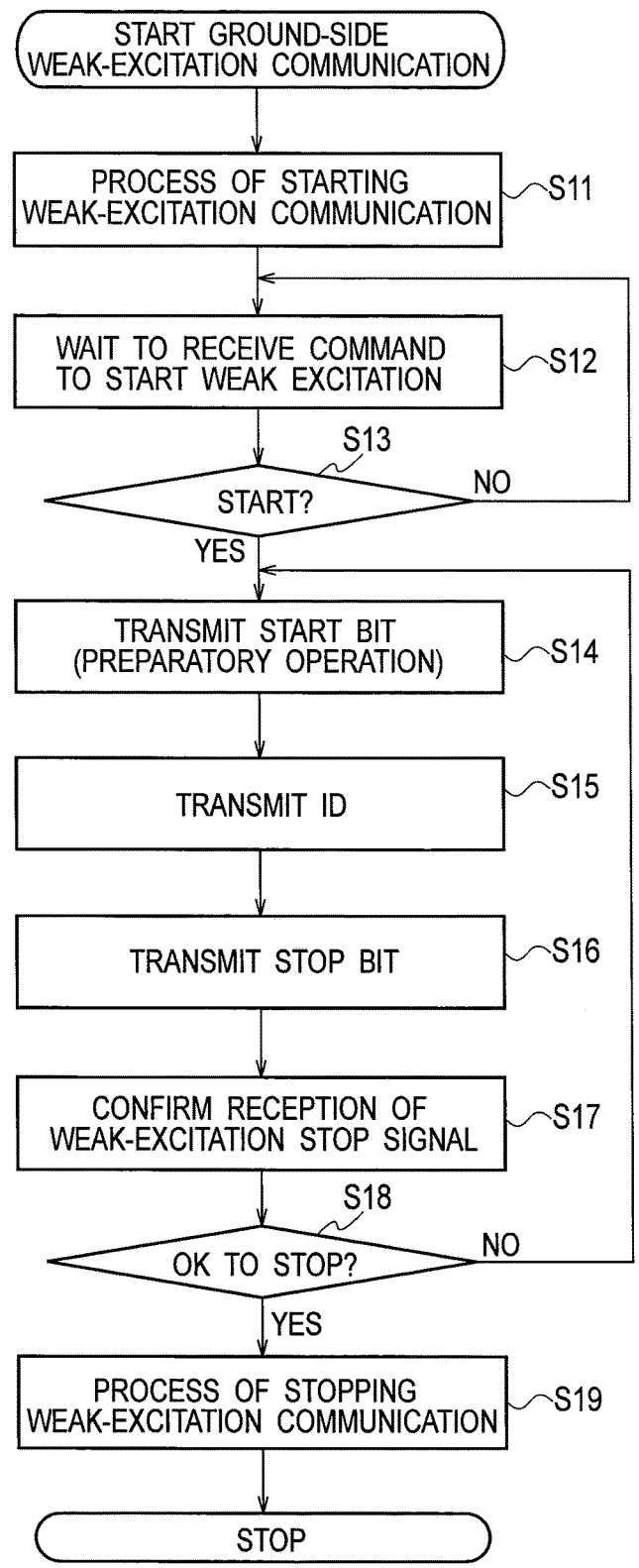
FIG. 22 is a flowchart showing processing performed by the ground controller to transmit an identification ID generated by first excitation.
Figure 23:
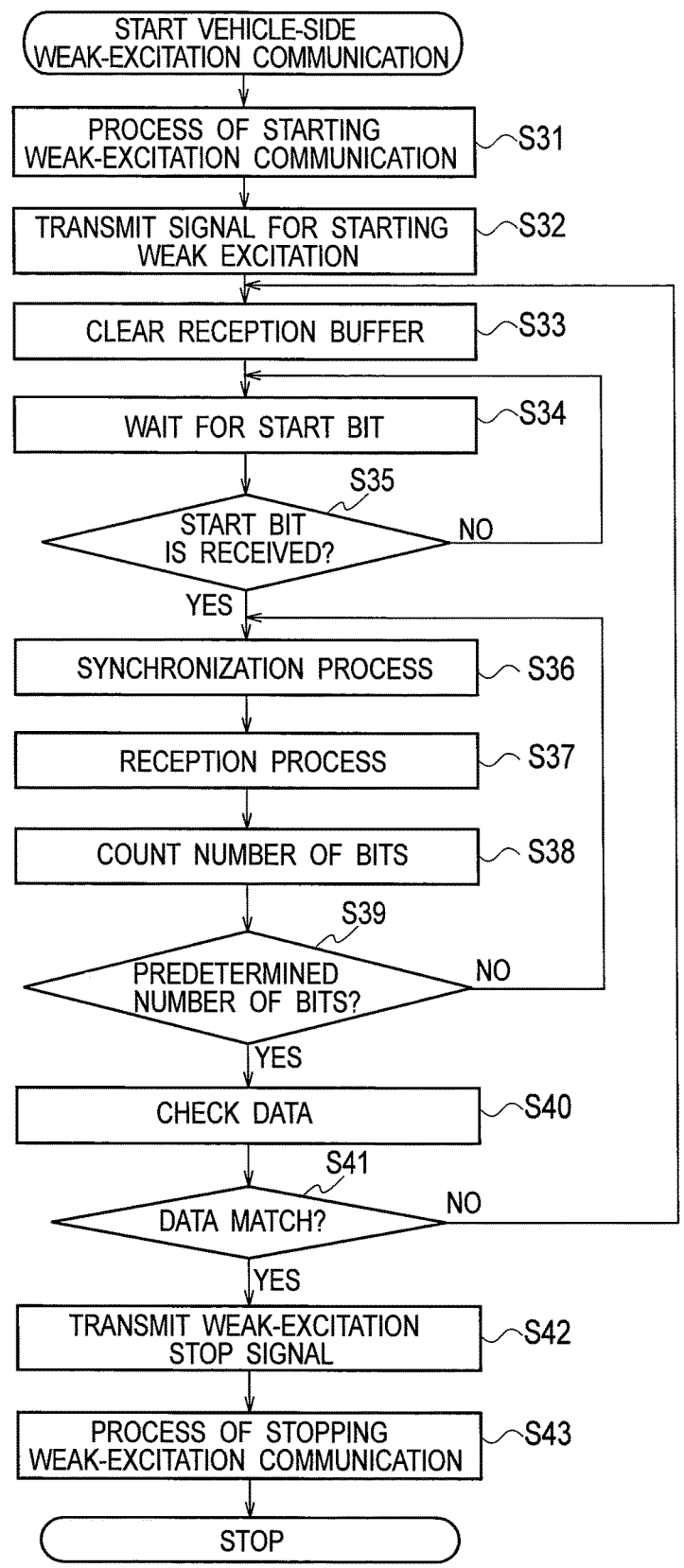
FIG. 23 is a flowchart showing processing performed by the vehicle controller to receive the identification ID generated by the first excitation.

Next, a detailed procedure of the pairing process performed in the wireless power supply system according to this embodiment will be described with reference to flowcharts shown in FIGS. 22 and 23. FIG. 23 is a flowchart showing the procedure of processing by control of the ground controller 13. This processing is performed when the vehicle detection sensor 33 detects that the vehicle 20 is approaching the desired position in the parking space 32.

Firstly in Step S11, the ground controller 13 performs a process of starting weak-excitation communication for setting the first excitation. Further, in Step S12, the ground controller 13 waits to receive a command for start of the weak excitation. In Step S13, the ground controller 13 determines whether or not a command to start the weak excitation is given. If a start command is given (YES in Step S13), the ground controller 13 advances the processing to Step S14.

In Step S14, the ground controller 13 excites the power transmission coil 11 by supplying a start-bit current thereto. Then in Step S15, the ground controller 13 excites the power transmission coil 11 by supplying identification-ID currents thereto. Further in Step S16, the ground controller 13 excites the power transmission coil 11 by supplying a stop-bit current thereto.

In Step S17, the ground controller 13 determines whether or not a reception confirmation signal is received from the vehicle controller 24. In Step S18, the ground controller 13 determines whether or not to stop the weak excitation. The ground controller 13 stops the weak excitation if determining in Step S18 that a reception confirmation signal is received. On the other hand, the ground controller 13 returns to the process in Step S14 if determining that a reception confirmation signal is not yet received. In Step S19, the ground controller 13 stops the weak excitation. That is, the ground controller 13 finishes the first excitation when pairing is completed.

Next, the procedure of processing by the vehicle controller 24 will be described with reference to the flowchart in FIG. 23. Firstly, the vehicle controller 24 performs a process of starting weak-excitation communication in Step S31, and transmits a signal indicating start of the weak excitation in Step S32. The vehicle controller 24 clears a reception buffer (not shown) in Step S33.

In Step S34, the vehicle controller 24 waits for a start bit. In Step S35, the vehicle controller 24 determines whether or not a start bit is received. If a start bit is received (YES in Step S35), the vehicle controller 24 performs a synchronization process in Step S36. In this process, synchronization is performed based on the timing of the start bit transmitted by the power transmission coil 11 and the timing of the start bit received by the power reception coil 21.

In Step S37, the vehicle controller 24 performs a reception process. In this process, the vehicle controller 24 receives an identification ID transmitted by the power transmission coil 11. In Step S38, the vehicle controller 24 counts the number of bits. In this embodiment, a four-bit identification ID is set as one example. Thus, in Step S39, the vehicle controller 24 determines whether or not a four-bit identification ID has been received. The vehicle controller 24 returns to the process in Step S36 if the number of bits is less than the predetermined number (NO in Step S39). On the other hand, the vehicle controller 24 advances the processing to Step S40 if the number of bits is the predetermined number (YES in Step S39).

In Step S40, the vehicle controller 24 checks the received four-bit identification ID. In Step S41, the vehicle controller 24 determines whether or not the received identification ID matches the identification ID assigned to the parking space 32. If the identification IDs do not match each other (NO in Step S41), the vehicle controller 24 moves the processing back to Step S33. If the identification IDs match each other (YES in Step S41), the vehicle controller 24 transmits a weak-excitation stop signal to the ground controller 13 via the communication unit 25 in Step S42. Then in Step S43, the vehicle controller 24 finishes the identification-ID communication process through the first excitation.

As described above, in the wireless power supply system according to the first embodiment, when the vehicle detection sensor 33 detects that the vehicle 20 has approached the parking space 32, currents are caused to flow through the power transmission coil 11 to set the power transmission coil 11 to the first excitation and transmit an identification ID. Then, the vehicle controller 24 recognizes an identification ID. If this identification ID and the identification ID transmitted by the power transmission coil 11 match each other, pairing between this parking space 32 and the vehicle 20 is completed. That is, one of the plurality of parking spaces 32 and the vehicle 20 are paired with each other. Hence, a connection is established between the vehicle 20 in need of battery charge and a ground unit 51 that supplies power.

Then, the current caused to flow through the power transmission coil 11 is changed to set the power transmission coil 11 to the second excitation, and the power transmission efficiency Q1 is calculated from the power received by the power reception coil 21 in this state. Thereafter, when the power transmission efficiency Q1 exceeds the threshold efficiency Qth, the vehicle 20 is determined to be in the chargeable range, and thus the power transmission coil 11 is set to the third excitation, so that the battery 23 starts to be charged.

In this way, the ground controller 13 can instantly recognize that the vehicle 20 has approached the parking space 32. Hence, the time required to set the power transmission coil 11 to the second excitation and then to the third excitation can be shortened. As a result, it is possible to prevent the user of the vehicle from waiting for a long time.

Also, when the power transmission coil 11 is set to the second excitation, the current caused to flow therethrough is set higher than that in the first excitation. In other words, the second excitation is stronger than the first excitation. In this way, it is possible to prevent false detection between the first excitation and the second excitation. Further, while the power transmission coil 11 is set to the second excitation, the power transmission efficiency Q1 is calculated based on the power transmitted to the power reception coil 21, and the power reception coil 21 is determined to be present in the chargeable range relative to the power transmission coil 11 when the power transmission efficiency Q1 exceeds the threshold efficiency Qth. In this way, it is possible to figure out when the power reception coil 21 reaches the chargeable range without providing a sensor such as a camera to the vehicle 20. Hence, the device configuration can be simpler.

Also, the rectification-smoothing circuit 22 of the power reception device 102 is provided with the discharge circuit 26. In this way, the magnitude of the voltage during the recognition of the identification ID can be constant. Hence, the accuracy of the recognition of the identification ID can be improved.

Description of Second Embodiment

Figure 5:
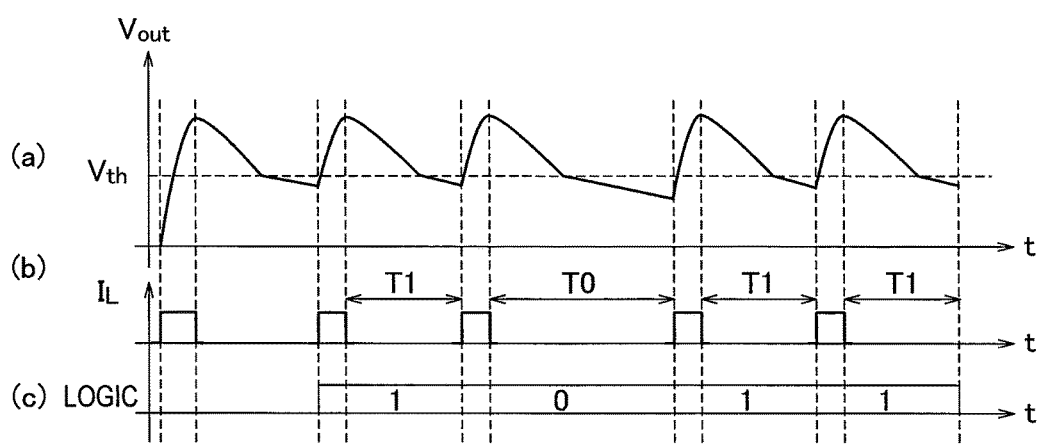
FIG. 5 is a timing chart showing the waveforms of signals in a wireless power supply system according to a second embodiment of the present invention, and Parts (a) to (c) show the output voltage Vout, the current IL, and logics, respectively.

Next, the second embodiment of the present invention will be described. The system configuration is similar to that in above-mentioned FIG. 1. The wireless power supply system according to the second embodiment differs from the above-described first embodiment in the excitation pattern in the first excitation. The operation of the wireless power supply system according to the second embodiment will be described below with reference to a timing chart shown in FIG. 5. In the above-described first embodiment, after a start bit is transmitted, the excitation pattern that causes the current I1 to flow is used when the identification ID indicates "1" (see P1, P2, P4 in FIG. 4) whereas the excitation pattern that does not cause the current I1 to flow is used when the identification ID indicates "0" (see P3 in FIG. 4).

In contrast, in the second embodiment, the identification ID is set by changing the time intervals at which to excite the power transmission coil 11. Specifically, for "1" the time interval from the present energization to the time of the next energization is set at T1 shown in FIG. 5, whereas for "0" the time interval to the time of the next energization is set at T0 longer than T1. Then, by detecting the time intervals of generation of the current IL shown in Part (b) of FIG. 5, the vehicle controller 24 can recognize an identification ID "1, 0, 1, 1," as shown in Part (c) of FIG. 5.

In this way, as in the above-described first embodiment, the wireless power supply system according to the second embodiment, too, can pair the parking space 32 and the vehicle 20 with each other, and the time required to set the power transmission coil 11 to the second excitation and the third excitation can be shortened.

Description of Third Embodiment

Figure 6:
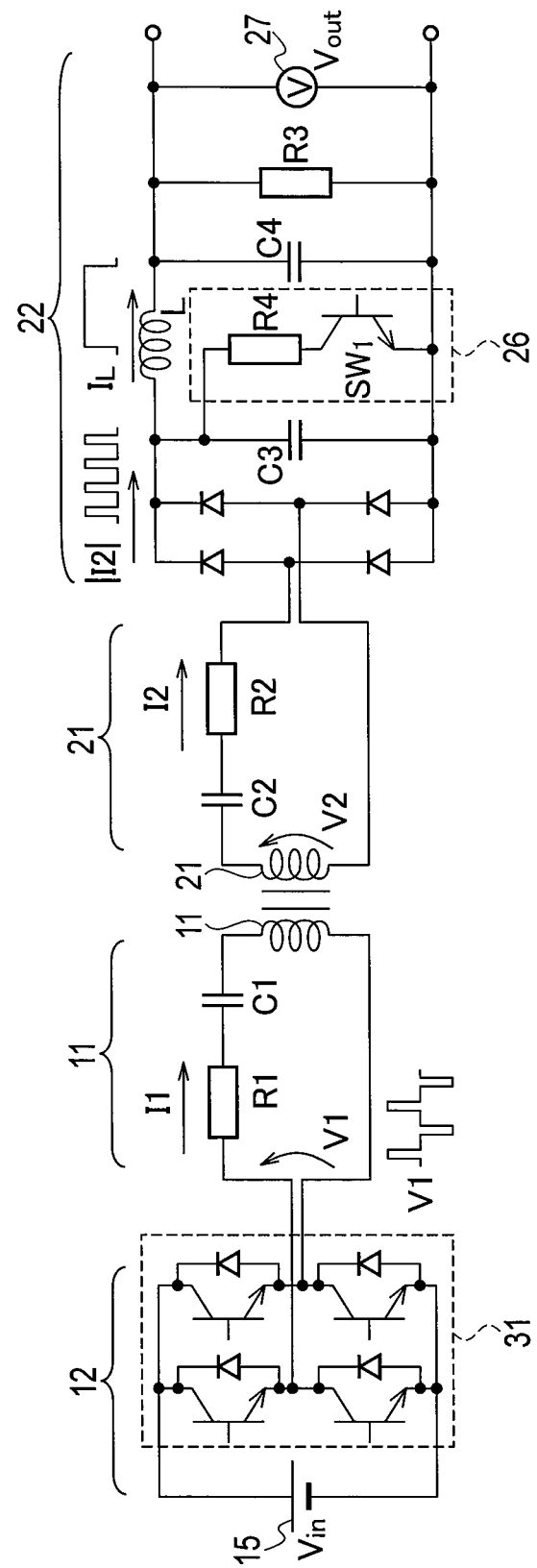
FIG. 6 is a circuit diagram of a power unit, a power transmission coil, a power reception coil, and a rectification-smoothing circuit of a wireless power supply system according to a third embodiment of the present invention.

Next, the third embodiment of the present invention will be described. FIG. 6 is a block diagram showing the configuration of a wireless power supply system according to the third embodiment. The third embodiment differs from the circuit in FIG. 3 shown in the above-described first and second embodiments in the position where the discharge circuit 26, formed of the resistor R4 and the switch SW1, is attached. Specifically, the discharge circuit 26 is connected to both terminals of the capacitor C3. The other features of the configuration are similar to those of the circuit shown in FIG. 3.

Moreover, in the wireless power supply system according to the third embodiment, the switch SW1 is turned on, thereby discharging the voltage charged in the capacitor C3 (smoothing capacitor), when the output voltage Vout exceeds the threshold voltage Vth. Hence, the output voltage Vout can be dropped. In this way, as in the above-described first and second embodiments, the wireless power supply system according to the third embodiment can, too, pair the parking space 32 and the vehicle 20 with each other, and the time required to set the power transmission coil 11 to the second excitation and the third excitation can be shortened.

Description of Fourth Embodiment

Figure 7:
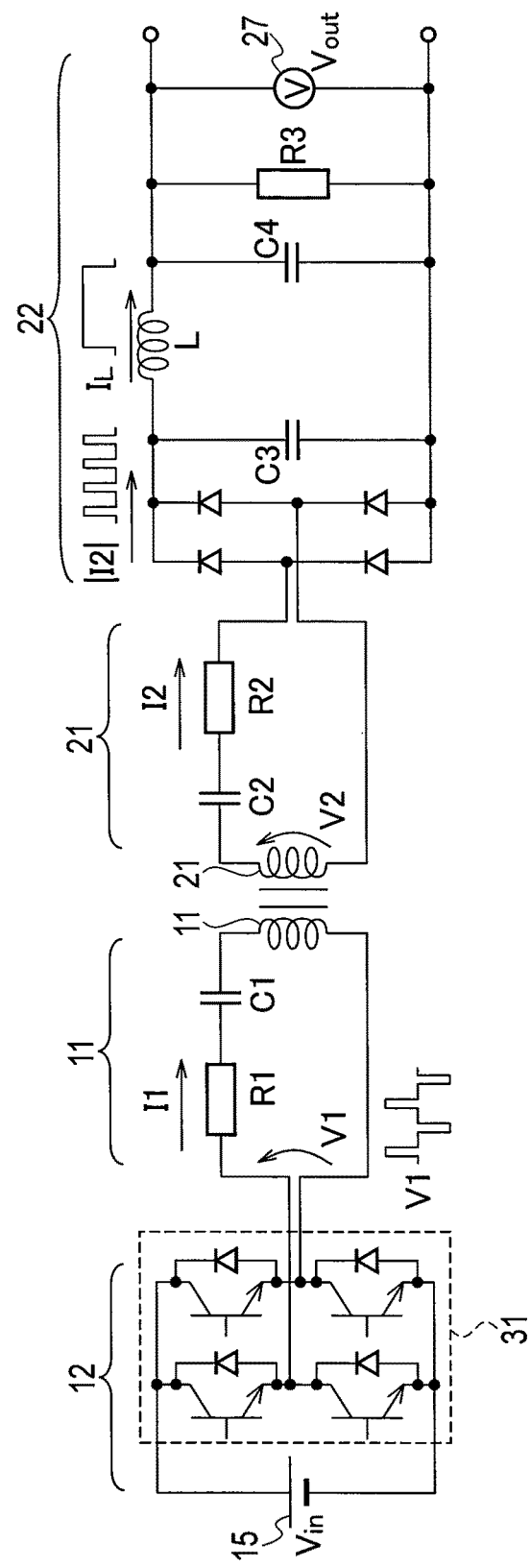
FIG. 7 is a circuit diagram of a power unit, a power transmission coil, a power reception coil, and a rectification-smoothing circuit of a wireless power supply system according to a fourth embodiment of the present invention.

Next, the fourth embodiment of the present invention will be described. FIG. 7 is a block diagram showing the configuration of a wireless power supply system according to the fourth embodiment. As shown in FIG. 7, the wireless power supply system according to the fourth embodiment differs from the systems shown in FIGS. 3 and 6 in that the discharge circuit 26, formed of the resistor R4 and the switch SW1, is not mounted. Specifically, in the above-described first to third embodiments, the switch SW1 is turned on to drop the output voltage Vout when the output voltage Vout exceeds the threshold voltage Vth. In contrast, in the fourth embodiment, while the capacitors C3, C4 are not charged, the voltage charged in the capacitor C4 is released by the discharge resistor R3 to drop the output voltage Vout.

Figure 8:
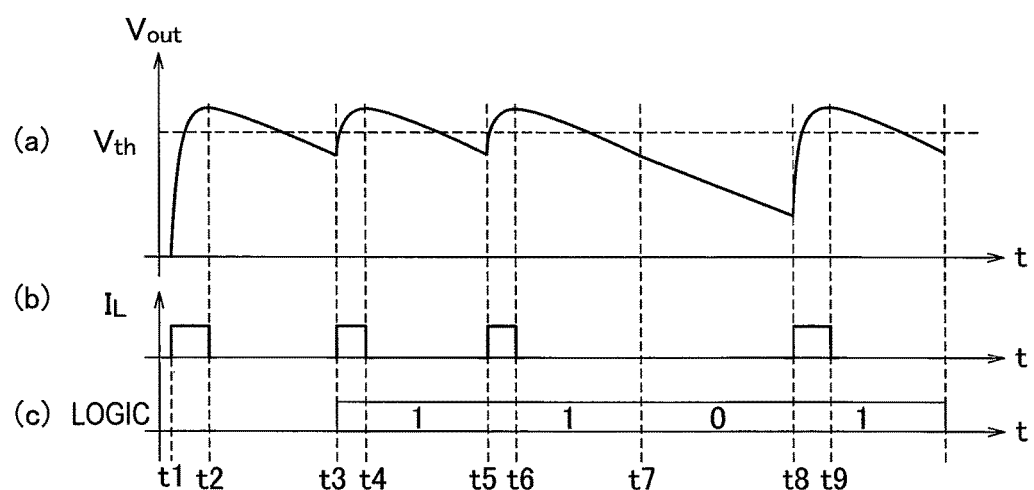
FIG. 8 is a timing chart showing the waveforms of signals in a wireless power supply system according to the fourth embodiment of the present invention, and Parts (a) to (c) show the output voltage Vout, the current IL, and logics, respectively.
Figure 9:
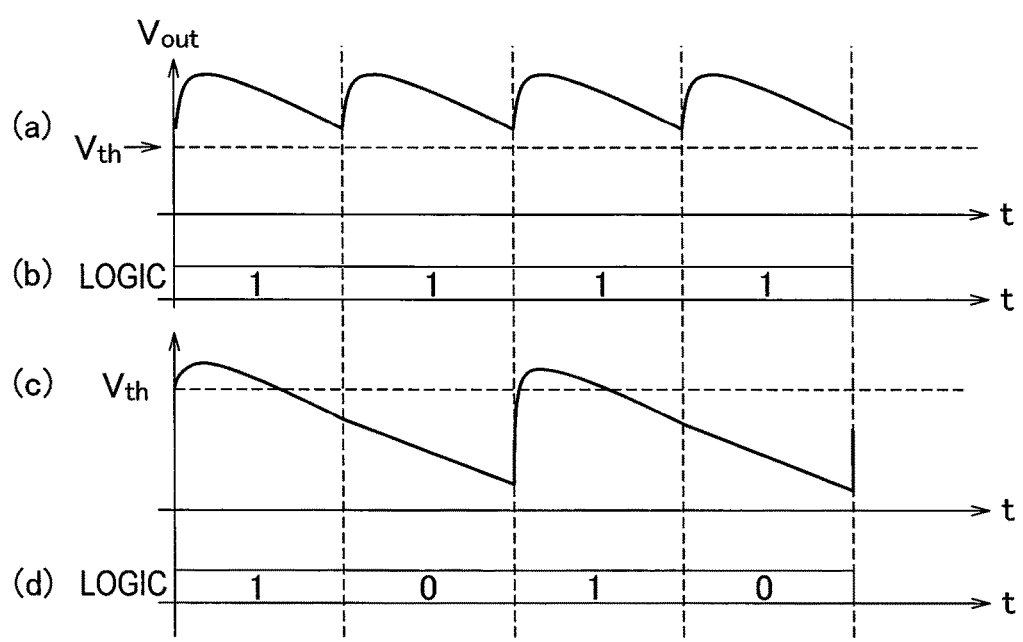
FIG. 9 is a timing chart showing the waveforms of some of the signals in the wireless power supply system according to the fourth embodiment of the present invention, and Parts (a) and (c) and Parts (b) and (d) show the output voltage Vout and logics, respectively.

Next, the operation of the wireless power supply system according to the fourth embodiment will be described with reference to a timing chart shown in FIG. 8. When a current IL indicating a start bit flows at a time t1, the output voltage Vout rises and exceeds the threshold voltage Vth. When the current IL then decreases at a time t2, the voltage at the capacitor C4 shown in FIG. 7 is discharged through the discharge resistor R3, so that the output voltage Vout drops. After that, when a current IL for indicating a logic "1" flows at a time t3, the output voltage Vout rises again and exceeds the threshold voltage Vth, and the output voltage Vout drops at a time t4. By performing similar operation at subsequent times t5 to t9, logics "1, 1, 0, 1" can be recognized. The subsequent processing is similar to those in the above-described first to third embodiments. Meanwhile, Parts (a) and (b) of FIG. 9 show the waveform of logics "1, 1, 1, 1" while Parts (c) and (d) of FIG. 9 show the waveform of logics "1, 0, 1, 0."

In this way, as in the above-described first to third embodiments, the wireless power supply system according to the fourth embodiment, too, can pair the parking space 32 and the vehicle 20 with each other, and the time required to set the power transmission coil 11 to the second excitation and the third excitation can be shortened. In addition, since the discharge circuit 26 does not need to be provided, the device configuration can be simpler.

Description of Fifth Embodiment

Figure 10:
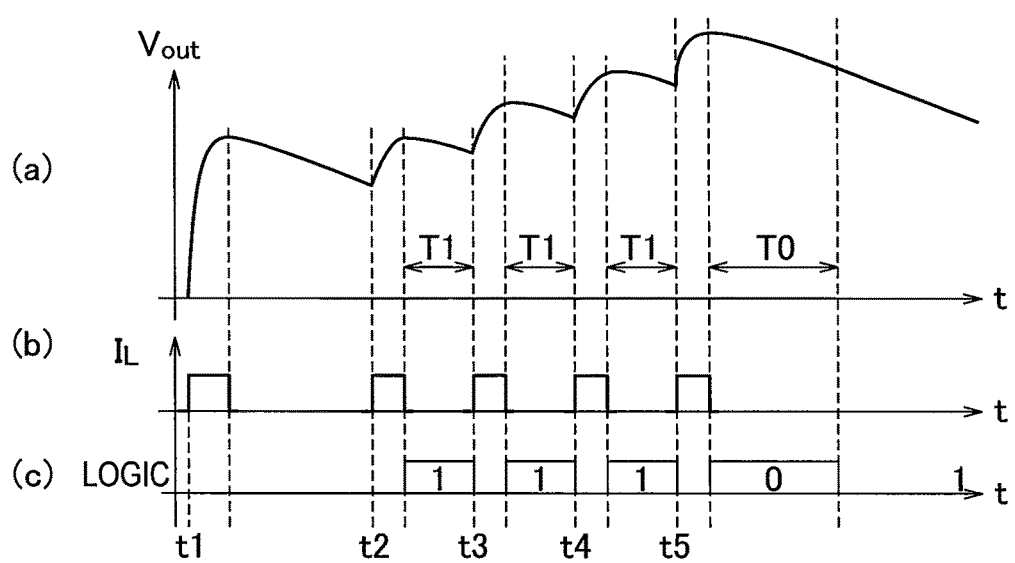
FIG. 10 is a timing chart showing the waveforms of signals in a wireless power supply system according to a fifth embodiment of the present invention, and Parts (a) to (c) show the output voltage Vout, the current IL, and logics, respectively.
Figure 11:
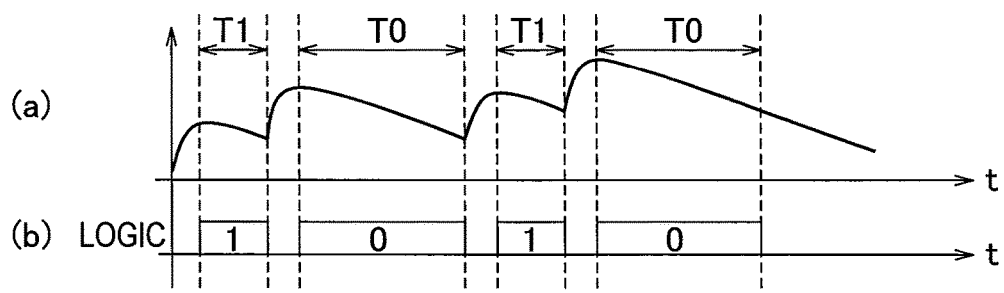
FIG. 11 is a timing chart showing the waveforms of some of the signals in the wireless power supply system according to the fifth embodiment of the present invention, and Parts (a) and (b) show the output voltage Vout and logics, respectively.

Next, the fifth embodiment of the present invention will be described. The system configuration is similar to that in FIG. 7 shown in the fourth embodiment, and description of the configuration will therefore be omitted. FIG. 10 is a timing chart showing the operation of the wireless power supply system according to the fifth embodiment, and Parts (a), (b), and (c) show the output voltage Vout, the current IL, and logics, respectively. FIG. 10 shows an example of transmitting logics "1, 1, 1, 0." A current IL indicating a start bit flows at a time t1 shown in FIG. 10 and then currents IL flow at times t2, t3, t4, t5. For a logic "1" the amount of time to the time when the next current IL flows is set at T1, whereas for a logic "0" the amount of time to the time when the next current IL flows is set at T0 (T0>T1). In this way, the logics "1" and "0" can be recognized. Meanwhile, in the case of logics "1, 0, 1, 0," the output voltage Vout is changed as shown in Part (a) of FIG. 11, and the logics "1, 0, 1, 0" can be recognized as shown in Part (b) of FIG. 11.

In this way, as in the above-described first to fourth embodiments, the wireless power supply system according to the fifth embodiment, too, can pair the parking space 32 and the vehicle 20 with each other, and the time required to set the power transmission coil 11 to the second excitation and the third excitation can be shortened. In addition, since the discharge circuit 26 does not need to be provided, the device configuration can be simpler.

Figure 12:
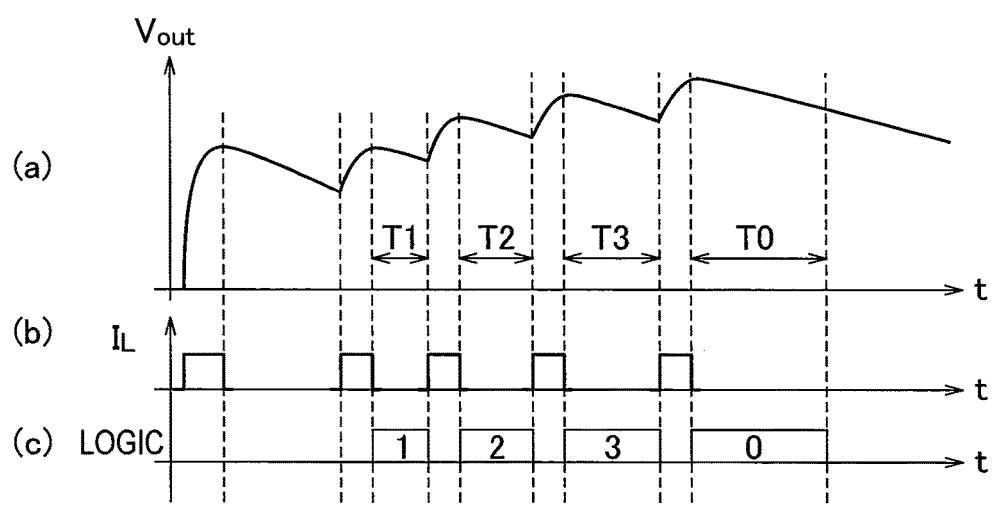
FIG. 12 is a timing chart showing the waveforms of signals in a wireless power supply system according to a modification of the fifth embodiment of the present invention, and Parts (a) to (c) show the output voltage Vout, the current IL, and logics, respectively.

FIG. 12 is a timing chart showing a modification of the fifth embodiment. In this modification, the interval between the currents IL is changed among four different intervals T1, T2, T3, T0, so that a two-bit logic is set. In this way, four different logics of 0, 1, 2, 3 can be set, thereby allowing more combinations for the identification ID to be set. Note that three or more bits can be used instead.

Description of Sixth Embodiment

Figure 13:
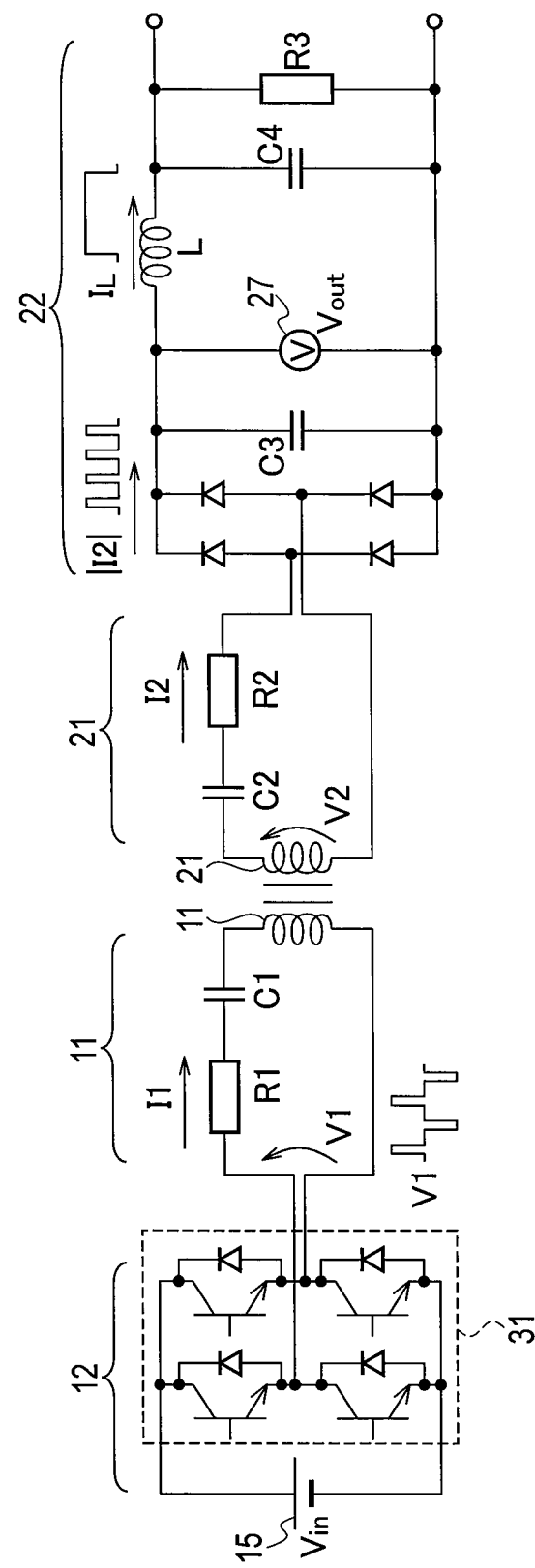
FIG. 13 is a circuit diagram of a power unit, a power transmission coil, a power reception coil, and a rectification-smoothing circuit of a wireless power supply system according to a sixth embodiment of the present invention.

Next, the sixth embodiment of the present invention will be described. FIG. 13 is a block diagram showing the configuration of a wireless power supply system according to the sixth embodiment. As shown in FIG. 13, in the sixth embodiment, the position where the voltage sensor 27 is attached is changed from that in the circuit shown in FIG. 7. Specifically, the voltage sensor 27 is attached to both terminals of the capacitor C3, and the voltage generated at the capacitor C is the output voltage Vout. The other features of the configuration are similar to those in the second embodiment. Moreover, the sixth embodiment, too, can achieve advantageous effects similar to those by the above-described first to fifth embodiments.

Description of Seventh Embodiment

Figure 14:
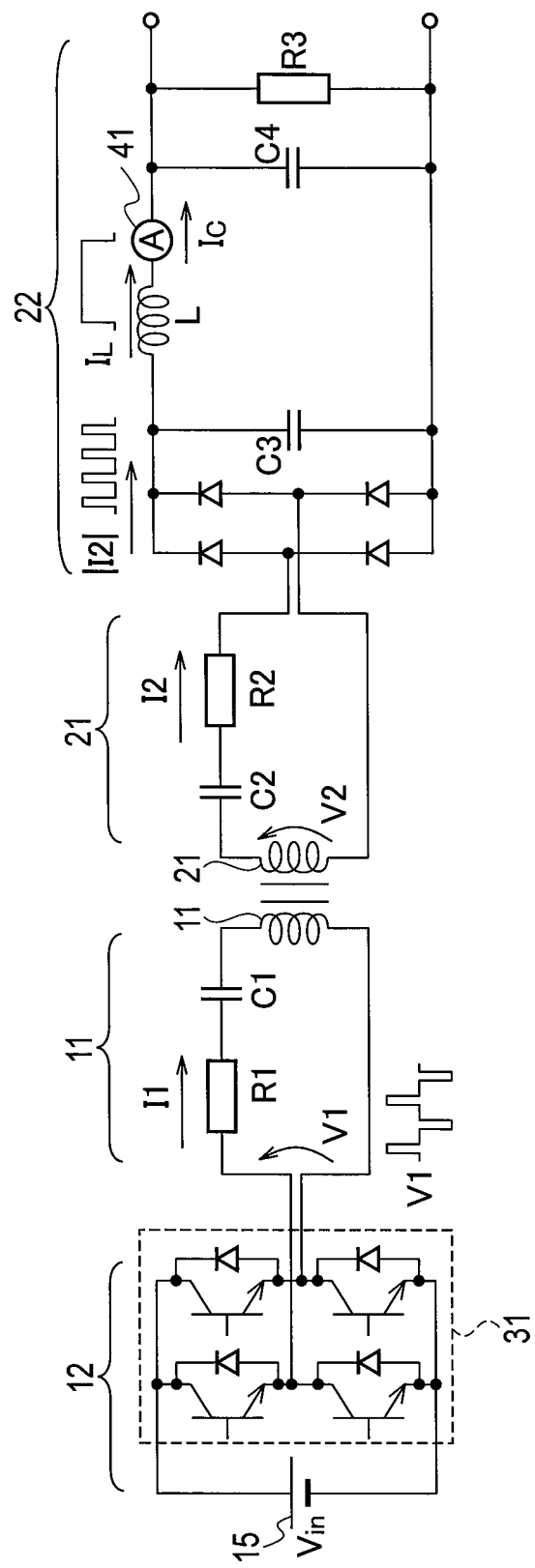
FIG. 14 is a circuit diagram of a power unit, a power transmission coil, a power reception coil, and a rectification-smoothing circuit of a wireless power supply system according to a seventh embodiment of the present invention.

Next, the seventh embodiment of the present invention will be described. FIG. 14 is a block diagram showing the configuration of a wireless power supply system according to the seventh embodiment. As shown in FIG. 14, the seventh embodiment differs from the circuit shown in FIG. 7 in that a current sensor 41 configured to measure the current flowing through the coil L is provided instead of the voltage sensor 27. In the seventh embodiment, logics are detected based on current Ic measured by the current sensor 41. The seventh embodiment, too, can achieve advantageous effects similar to those by the above-described first to fifth embodiments.

Description of Eighth Embodiment

Figure 15:
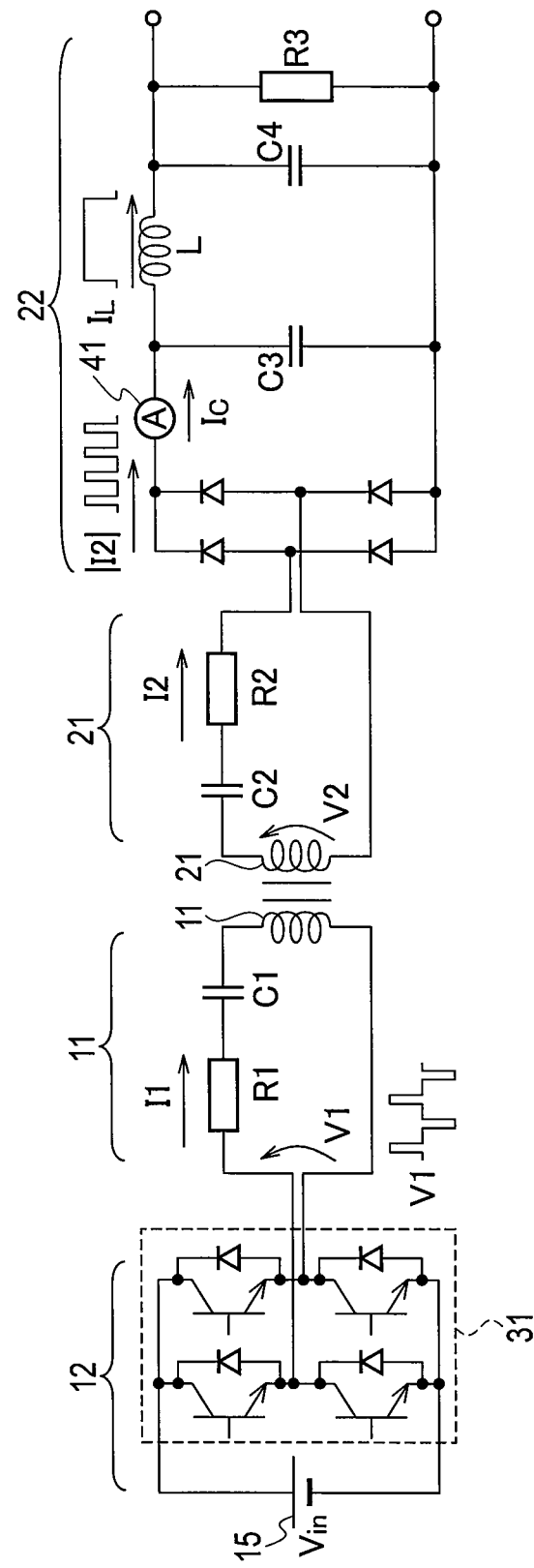
FIG. 15 is a circuit diagram of a power unit, a power transmission coil, a power reception coil, and a rectification-smoothing circuit of a wireless power supply system according to an eighth embodiment of the present invention.

Next, the eighth embodiment of the present invention will be described. FIG. 15 is a block diagram showing the configuration of a wireless power supply system according to the eighth embodiment. As shown in FIG. 15, the eighth embodiment differs from the circuit shown in FIG. 7 in that a current sensor 41 configured to measure the output current from the bridge circuit is provided instead of the voltage sensor 27. In the eighth embodiment, logics are detected based on current Ic measured by the current sensor 41. The eighth embodiment, too, can achieve advantageous effects similar to those by the above-described first to fifth embodiments.

Description of Ninth Embodiment

Figure 16:
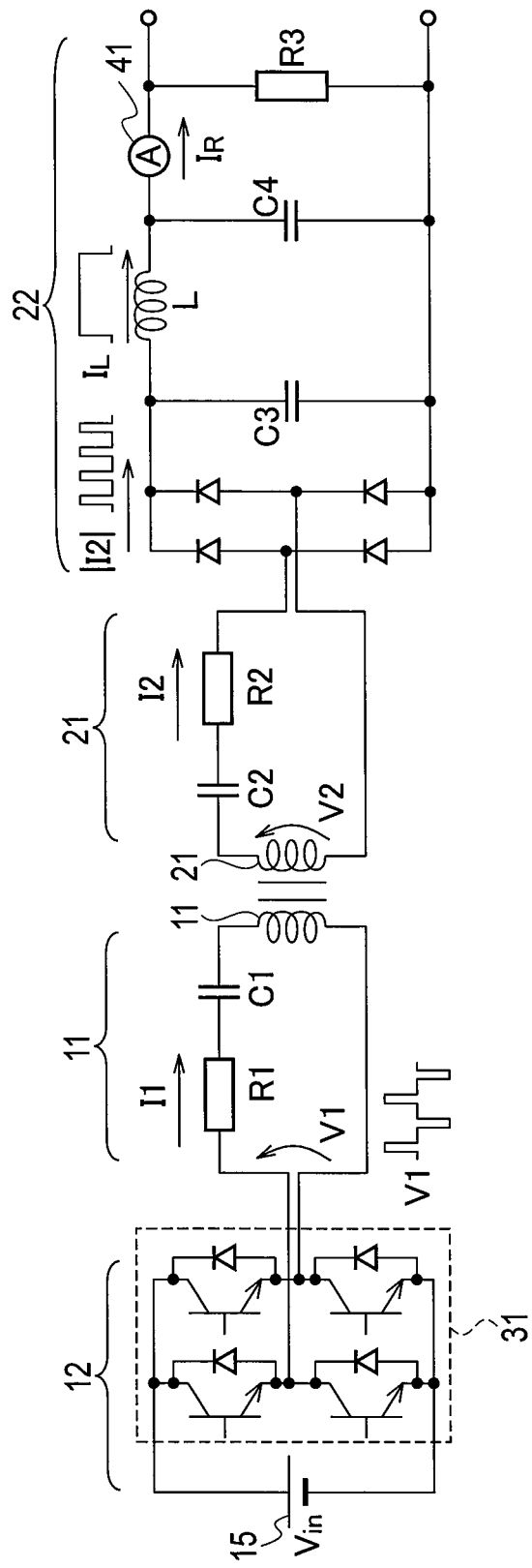
FIG. 16 is a circuit diagram of a power unit, a power transmission coil, a power reception coil, and a rectification-smoothing circuit of a wireless power supply system according to a ninth embodiment of the present invention.

Next, the ninth embodiment of the present invention will be described. FIG. 16 is a block diagram showing the configuration of a wireless power supply system according to the ninth embodiment. As shown in FIG. 16, the ninth embodiment differs from the circuit shown in FIG. 7 in that a current sensor 41 configured to measure the output current from the capacitor C4 is provided instead of the voltage sensor 27. In the ninth embodiment, logics are detected based on current Ic measured by the current sensor 41. The ninth embodiment, too, can achieve advantageous effects similar to those by the above-described first to fifth embodiments.

The wireless power supply system and the power transmission device of the present invention have been described above based on the illustrated embodiments. However, the present invention is not limited to these. Each component can be replaced with any component having a similar function(s).

REFERENCE SIGNS LIST 11, 11a power transmission coil
12, 12a power unit
13 ground controller
14 communication unit
15 DC power source (voltageVin)
20 vehicle
21 power reception coil
22 rectification-smoothing circuit
23 battery
24 vehicle controller
25 communication unit
26 discharge circuit
27 voltage sensor
31 inverter circuit
32, 32a parking space
33, 33a vehicle detection sensor
41 current sensor
51, 51a ground unit
101 power transmission device
102 power reception device

The invention claimed is:
1. A wireless power supply system comprising a power transmission device and a power reception device and configured to wirelessly transmit power from the power transmission device to the power reception device, the power transmission device being provided on the ground and including a power transmission coil installed at a parking space, the power reception device being provided to a vehicle and including a power reception coil, wherein
the power transmission device includes
an approach detection sensor configured to detect when the vehicle approaches the parking space,
a power-supply control unit configured to control power to be supplied to the power transmission coil, and a power-transmission-side communication unit configured to communicate with the power reception device, the power reception device includes
- a power-reception control unit configured to control reception of power at the power reception coil, and
- a power-reception-side communication unit configured to communicate with the power transmission device,
- when the vehicle approaches the parking space, the power-supply control unit sets the power transmission coil to first excitation in which the power transmission coil is excited in an excitation pattern containing identification data,
- when the power transmission coil is set to the first excitation, the power-reception control unit acquires the identification data from the excitation pattern received by the power reception coil, and transmits the identification data to the power transmission device,
- the power-supply control unit determines whether or not the identification data contained in the excitation pattern when setting the power transmission coil to the first excitation and the identification data acquired from the excitation pattern received by the power reception coil match each other, and
- if the pieces of identification data match each other, the power-supply control unit sets the power transmission coil to second excitation for determining whether or not the vehicle is present at a chargeable position in the parking space, and the power reception device further includes
- a smoothing capacitor configured to smooth the power received by the power reception coil, and
- a discharge circuit configured to discharge power stored in the smoothing capacitor, when voltage generated at the smoothing capacitor exceeds a preset threshold voltage while the power transmission coil is set to the first excitation.

2. The wireless power supply system according to claim 1, wherein
the power-reception control unit detects power received while the power transmission coil is set to the second excitation,
any one of the power-reception control unit and the power-supply control unit calculates power transmission efficiency from the received power and a power-supply command value set for the power transmission device, and
the power-supply control unit determines whether or not the vehicle is present at the chargeable position in the parking space, based on the power transmission efficiency.

3. The wireless power supply system according to claim 1, wherein the second excitation is stronger than the first excitation.

4. A power transmission device including a power transmission coil installed a parking space and configured to wirelessly supply power to a power reception coil mounted on a vehicle by exciting the power transmission coil when the vehicle stops at the parking space, the power transmission device comprising:
an approach detection sensor configured to detect when the vehicle approaches the parking space;
a power-supply control unit configured to control current to be supplied to the power transmission coil; and
a communication unit configured to communicate with the vehicle, wherein when the vehicle approaches the parking space, the power-supply control unit sets the power transmission coil to first excitation in which the power transmission coil is excited in an excitation pattern containing identification data,
when the communication unit receives identification data transmitted from the vehicle, the power-supply control unit determines whether or not the received identification data and the identification data contained in the excitation pattern when setting the power transmission coil to the first excitation match each other, and
if the pieces of identification data match each other, the power-supply control unit pairs the vehicle and the parking space with each other, the power-supply control unit then sets the power transmission coil to second excitation for determining whether or not the vehicle is present at a chargeable position in the parking space, and
the power-supply control unit disconnects the pairing if it is detected after the power transmission coil is set to the second excitation that the vehicle reaches the chargeable position in the parking space but the vehicle then leaves the chargeable position in the parking space before start of supply of power to the vehicle.

5. The power transmission device according to claim 4, wherein the power-supply control unit acquires data on received power transmitted from the vehicle, calculates power transmission efficiency from the received power and a power-supply command value set for the power-supply control unit, and determines that the vehicle is present at the chargeable position in the parking space, when the power transmission efficiency exceeds a threshold efficiency.

6. The power transmission device according to claim 4, wherein the second excitation is stronger than the first excitation.

7. A wireless power supply system comprising a power transmission device and a power reception device and configured to wirelessly transmit power from the power transmission device to the power reception device, the power transmission device being provided on the ground and including a power transmission coil installed at a parking space, the power reception device being provided to a vehicle and including a power reception coil, wherein the power transmission device includes
- an approach detection sensor configured to detect when the vehicle approaches the parking space,
- a power-supply control unit configured to control power to be supplied to the power transmission coil, and
- a power-transmission-side communication unit configured to communicate with the power reception device, the power reception device includes
- a power-reception control unit configured to control reception of power at the power reception coil, and
- a power-reception-side communication unit configured to communicate with the power transmission device,
- when the vehicle approaches the parking space, the power-supply control unit sets the power transmission coil to first excitation in which the power transmission coil is excited in an excitation pattern containing identification data,
- when the power transmission coil is set to the first excitation, the power-reception control unit acquires the identification data from the excitation pattern received by the power reception coil, and transmits the identification data to the power transmission device, the power-supply control unit determines whether or not the identification data contained in the excitation pattern when setting the power transmission coil to the first excitation and the identification data acquired from the excitation pattern received by the power reception coil match each other, if the pieces of identification data match each other, the power-supply control unit sets the power transmission coil to second excitation for determining whether or not the vehicle is present at a chargeable position in the parking space, the power-reception control unit detects power received after the power transmission coil is set to the second excitation, to determine whether or not the vehicle leaves an excitation range of the power transmission coil, and the power-supply control unit disconnects pairing between the power transmission device and the power reception device if the power-reception control unit determines that the vehicle leaves the excitation range.

* * * * *